US011181988B1

(12) United States Patent
Bellegarda et al.

(10) Patent No.: US 11,181,988 B1
(45) Date of Patent: Nov. 23, 2021

(54) INCORPORATING USER FEEDBACK INTO TEXT PREDICTION MODELS VIA JOINT REWARD PLANNING

(71) Applicant: Apple Inc., Cupertino, CA (US)

(72) Inventors: Jerome R. Bellegarda, Saratoga, CA (US); Akash Mehra, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/008,265

(22) Filed: Aug. 31, 2020

(51) Int. Cl.
*G06N 3/08* (2006.01)
*G06F 3/023* (2006.01)
*G06F 40/284* (2020.01)
*G06F 3/0481* (2013.01)
*G06F 3/0488* (2013.01)

(52) U.S. Cl.
CPC .......... *G06F 3/0237* (2013.01); *G06F 3/0481* (2013.01); *G06F 3/04886* (2013.01); *G06F 40/284* (2020.01); *G06N 3/08* (2013.01)

(58) Field of Classification Search
CPC .. G06F 3/0237; G06F 3/04886; G06F 3/0481; G06F 40/284; G06N 3/08
See application file for complete search history.

(56) References Cited

U.S. PATENT DOCUMENTS

| 7,679,534 | B2 | 3/2010 | Kay et al. |
| 7,752,152 | B2 | 7/2010 | Paek et al. |
| 9,697,822 | B1 | 7/2017 | Naik et al. |
| 10,049,668 | B2 | 8/2018 | Huang et al. |
| 10,210,860 | B1 * | 2/2019 | Ward ...................... G10L 15/30 |
| 10,860,629 | B1 * | 12/2020 | Gangadharaiah ....... H04L 51/02 |
| 2009/0225041 | A1 | 9/2009 | Kida et al. |

(Continued)

FOREIGN PATENT DOCUMENTS

| WO | 2016/033257 A1 | 3/2016 |
| WO | 2017/059388 A1 | 4/2017 |

OTHER PUBLICATIONS

Bellegarda, Jeromer., "Chapter 1: Spoken Language Understanding for Natural Interaction: The Siri Experience", Natural Interaction with Robots, Knowbots and Smartphones, 2014, pp. 3-14.

(Continued)

*Primary Examiner* — Keith D Bloomquist
(74) *Attorney, Agent, or Firm* — Dentons US LLP

(57) ABSTRACT

An example process includes: obtaining input token(s); determining, using a joint prediction model, based on the input token(s): a first predicted token following the input token(s) and a second predicted token following the first predicted token; and a first user action to be performed on the first predicted token, where determining the first user action includes: determining a first reward value for performing the first user action based on a first current reward value for performing the first user action and a second reward value for performing a second user action on the second predicted token; outputting the first predicted token; detecting a user action performed on the first predicted token; and in accordance with a determination that the detected user action does not match the first user action: causing parameters of the joint prediction model to be updated, the parameters being configured to determine the first user action.

57 Claims, 16 Drawing Sheets

(56) References Cited

U.S. PATENT DOCUMENTS

| | | |
|---|---|---|
| 2010/0164897 A1 | 7/2010 | Morin et al. |
| 2012/0029910 A1 | 2/2012 | Medlock et al. |
| 2012/0053945 A1 | 3/2012 | Gupta et al. |
| 2012/0078747 A1 | 3/2012 | Chakrabarti et al. |
| 2012/0223889 A1 | 9/2012 | Medlock et al. |
| 2012/0259615 A1 | 10/2012 | Morin et al. |
| 2012/0324391 A1 | 12/2012 | Tocci |
| 2013/0253912 A1 | 9/2013 | Medlock et al. |
| 2013/0325436 A1 | 12/2013 | Wang et al. |
| 2014/0142923 A1 | 5/2014 | Jones et al. |
| 2014/0278349 A1 | 9/2014 | Grieves et al. |
| 2014/0278379 A1 | 9/2014 | Coccaro et al. |
| 2014/0297267 A1 | 10/2014 | Spencer et al. |
| 2014/0351741 A1 | 11/2014 | Medlock et al. |
| 2015/0100537 A1 | 4/2015 | Grieves et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2016/0063998 A1 | 3/2016 | Krishnamoorthy et al. |
| 2016/0093301 A1 | 3/2016 | Bellegarda et al. |
| 2016/0282956 A1 | 9/2016 | Ouyang et al. |
| 2016/0321239 A1 | 11/2016 | Iso-sipilä et al. |
| 2016/0371250 A1 | 12/2016 | Rhodes |
| 2017/0090428 A1* | 3/2017 | Oohara ................. G06N 3/08 |
| 2017/0091168 A1 | 3/2017 | Bellegarda et al. |
| 2017/0357632 A1 | 12/2017 | Pagallo et al. |
| 2017/0357640 A1 | 12/2017 | Bellegarda et al. |
| 2018/0018814 A1* | 1/2018 | Dahm .................. G06T 15/506 |
| 2018/0089166 A1 | 3/2018 | Meyer et al. |
| 2018/0101599 A1* | 4/2018 | Arnold ................. G06F 40/274 |
| 2018/0150744 A1 | 5/2018 | Orr et al. |
| 2018/0300317 A1* | 10/2018 | Bradbury ............. G06F 40/216 |
| 2018/0300400 A1* | 10/2018 | Paulus .................. G06F 40/58 |
| 2018/0322112 A1 | 11/2018 | Bellegarda et al. |
| 2018/0329998 A1 | 11/2018 | Thomson et al. |
| 2018/0330721 A1 | 11/2018 | Thomson et al. |
| 2018/0349349 A1 | 12/2018 | Bellegarda et al. |
| 2019/0287012 A1* | 9/2019 | Celikyilmaz .......... G06F 40/56 |
| 2020/0218780 A1* | 7/2020 | Mei ....................... G06F 40/35 |
| 2020/0334492 A1* | 10/2020 | Yuan .................... G06F 40/279 |
| 2021/0110115 A1* | 4/2021 | Hermann ............... G06F 40/30 |
| 2021/0110254 A1* | 4/2021 | Hoang ................... G06N 3/08 |
| 2021/0150151 A1* | 5/2021 | Xu ....................... G06K 9/6256 |

OTHER PUBLICATIONS

Gasic et al., "Effective Handling of Dialogue State in the Hidden Information State POMDP-based Dialogue Manager", ACM Transactions on Speech and Language Processing, May 2011, pp. 1-25.

Lee, Sungjin, "Structured Discriminative Model for Dialog State Tracking", Proceedings of the SIGDIAL 2013 Conference, Aug. 22-24, 2013, pp. 442-451.

Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.

Sundermeyer et al., "LSTM Neural Networks for Language Modeling", Interspeech 2012, ISCA's 13 Annual Conference, Sep. 9-13, 2012, pp. 194-197.

Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.

Yeh Jui-Feng, "Speech Act Identification Using Semantic Dependency Graphs with Probabilistic Context-free Grammars", ACM Transactions on Asian and Low-Resource Language Information Processing, vol. 15, No. 1, Dec. 2015, pp. 5.1-5.28.

Young et al., "The Hidden Information State model: A practical framework for POMDP-based spoken dialogue management", Computer Speech & Language, vol. 24, Issue 2, Apr. 2010, pp. 150-174.

Mikolov et al., "Recurrent Neural Network Based Language Model", INTERSPEECH 2010, Sep. 26-30, 2010, pp. 1045-1048.

Mnih et al., "Human-level Control Through Deep Reinforcement Learning", Nature, vol. 518, Feb. 26, 2015, pp. 529-533.

Tamar et al., "Value Iteration Networks", Advances in Neural Information Processing Systems, vol. 29, 2016, pp. 2154-2162.

* cited by examiner

INCORPORATING USER FEEDBACK INTO TEXT PREDICTION MODELS VIA JOINT REWARD PLANNING

FIELD

The present disclosure relates generally to text prediction.

BACKGROUND

Text prediction models can generate text predictions based on user inputted text. Users may then provide feedback on the generated predictions. For example, user actions performed on a prediction, such as selecting the prediction when displayed or inputting text different from the prediction, can indicate whether the prediction is correct.

BRIEF SUMMARY

An example process includes at an electronic device with one or more processors and memory: obtaining one or more input tokens; determining, using a joint prediction model, based on the one or more input tokens: a first predicted token following the one or more input tokens and a second predicted token following the first predicted token; and a first user action to be performed on the first predicted token, where determining the first user action includes: determining a first reward value for performing the first user action based on a first current reward value for performing the first user action and a second reward value for performing a second user action on the second predicted token; outputting the first predicted token; after outputting the first predicted token, detecting a user action performed on the first predicted token; and in accordance with a determination that the detected user action does not match the first user action: causing a first set of one or more parameters of the joint prediction model to be updated, where the first set of one or more parameters is configured to determine the first user action.

Determining a predicted token and a user action to be performed on the predicted token and updating parameters of the joint prediction model in accordance with determining that a detected user action does not match the determined user action may incorporate user feedback information into the prediction model. Incorporating user feedback in such manner may improve and personalize text prediction for users. For example, if the determined (predicted) user action is accepting a predicted word but the detected (actual) user action is inputting a different word (meaning the predicted word is incorrect), the prediction model may be updated to correctly predict the user-inputted word in the future. Further, as discussed herein, determining the first reward value discussed above may allow user actions to be more accurately determined. More accurately determining user actions may in turn allow the prediction model to more accurately determine predicted tokens (e.g., more accurately predict text). In this manner, the user-device interface is made more efficient (e.g., by improving the accuracy of predictive typing, by personalizing predictive typing according to user feedback, by allowing users to quickly and accurately input text, and by reducing user inputs to correct wrong text predictions), which additionally reduces power usage and improves battery life of the device by enabling the user to use the device more quickly and efficiently.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

Figure 6:
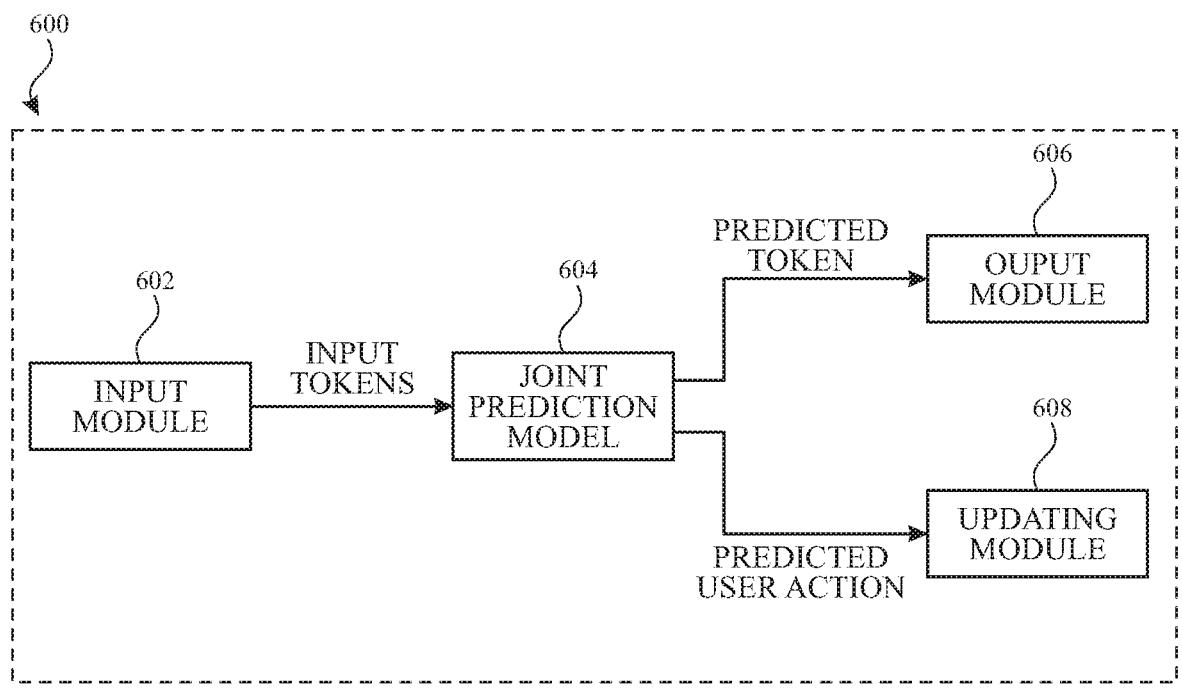
FIG. 6 illustrates a system for incorporating user feedback into a joint prediction model, according to some embodiments.
Figure 7:
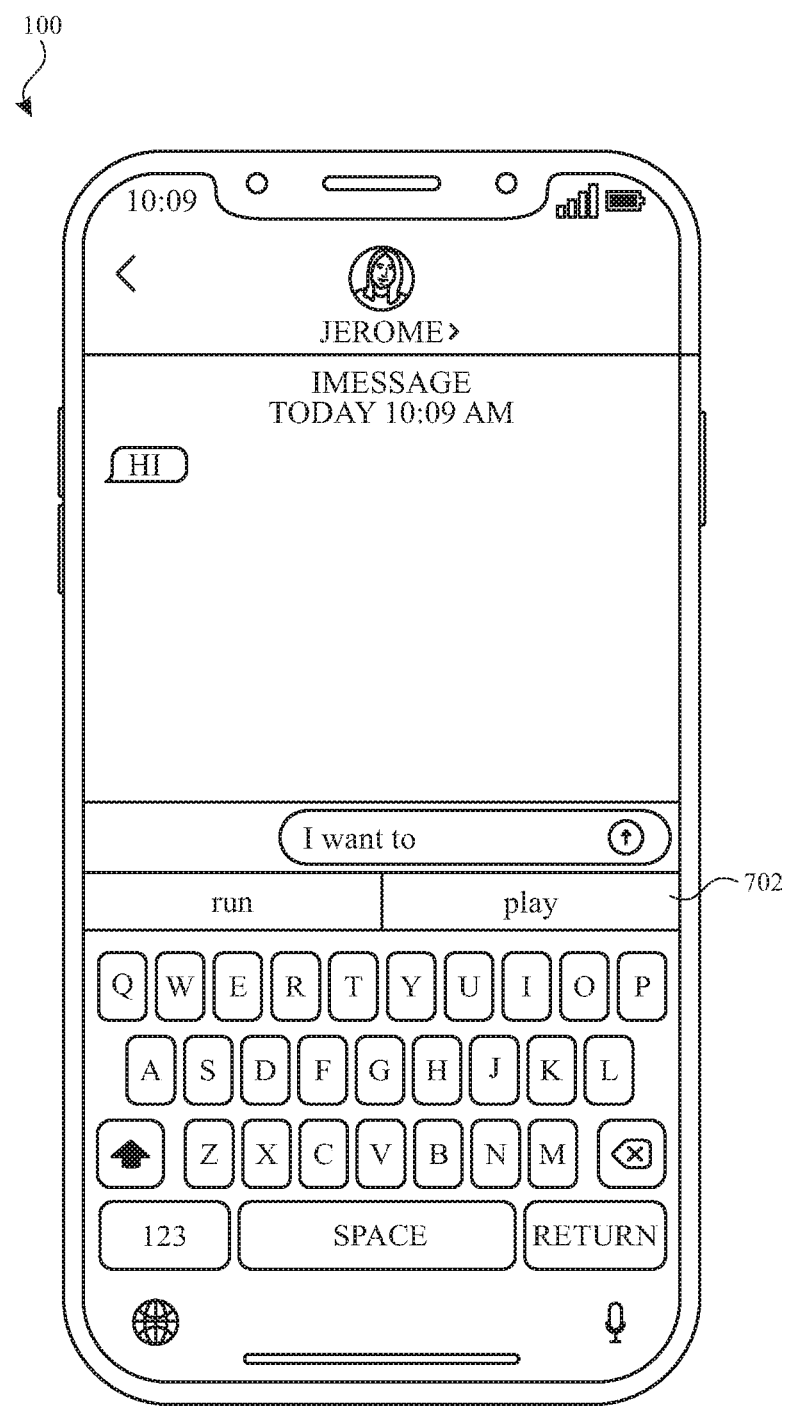
FIG. 7 illustrates text prediction at an electronic device, according to some embodiments.
Figure 8:
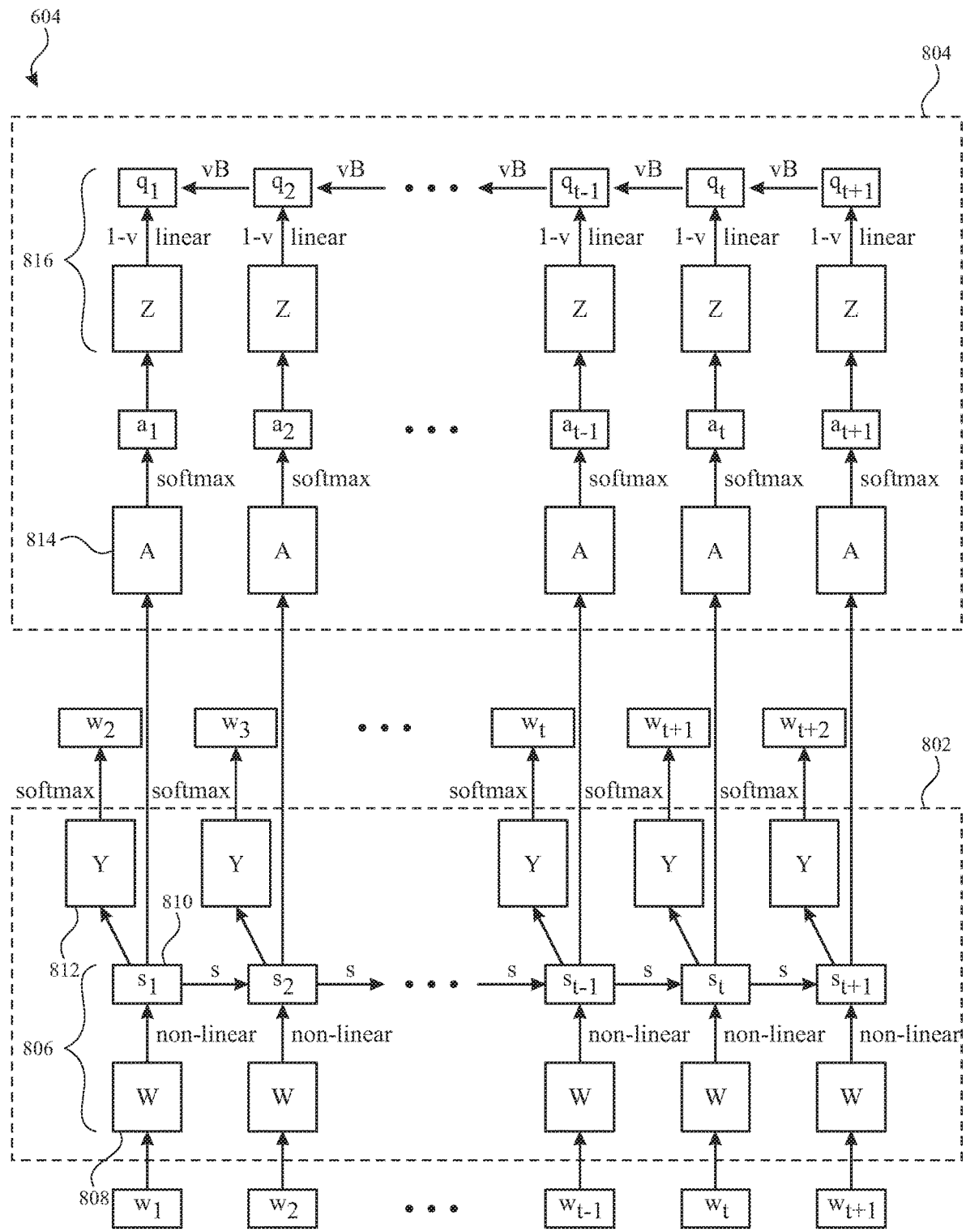
FIG. 8 illustrates an exemplary architecture of a joint prediction model, according to some embodiments.
Figure 9:
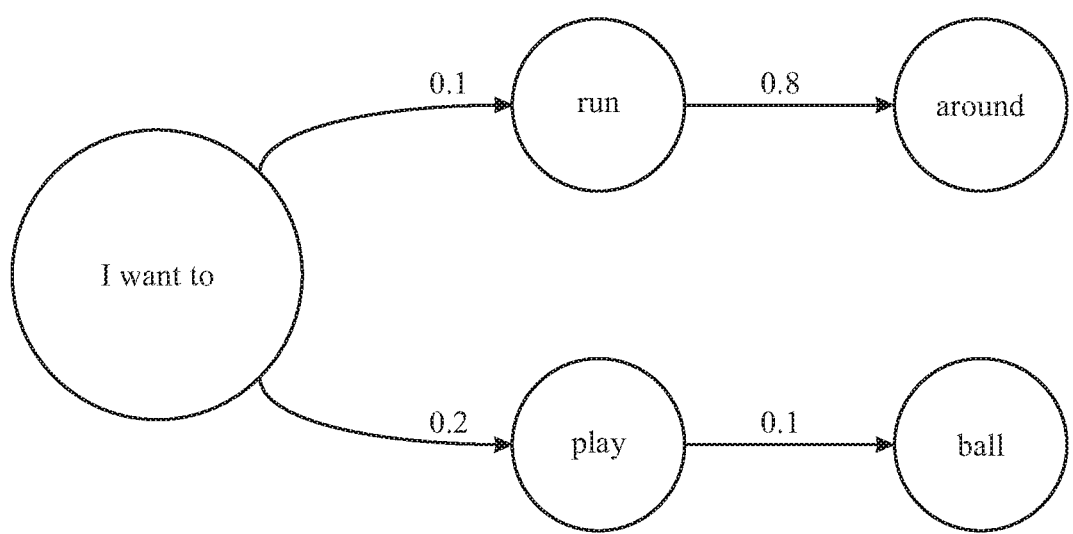
FIG. 9 illustrates reward values for transitioning between states in a Markov Decision Process (MDP) for text and action prediction, according to some embodiments.
Figure 10A:
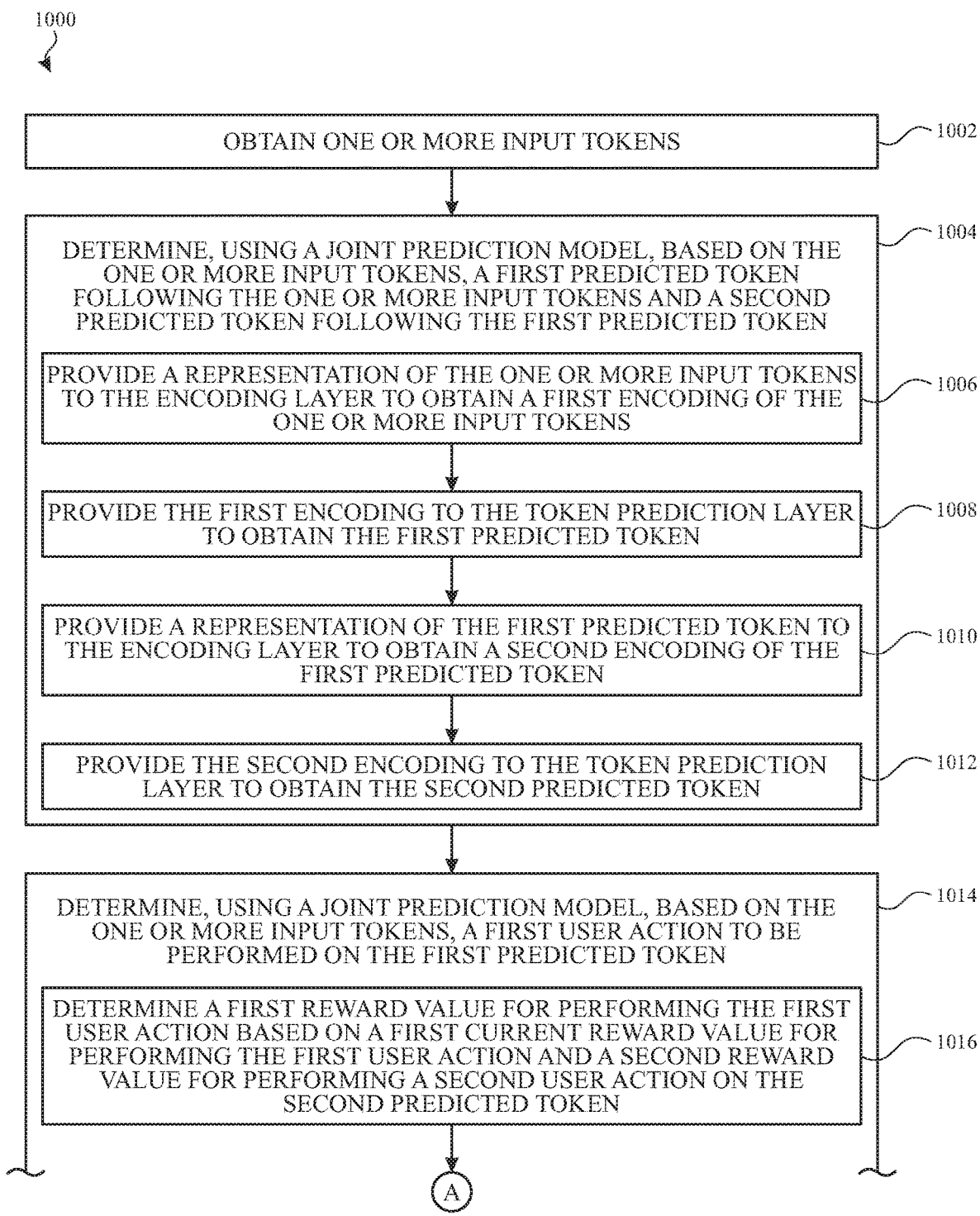
FIGS. 10A-D illustrate a flow diagram of a process for incorporating user feedback into a joint prediction model, according to some embodiments.
Figure 10B:
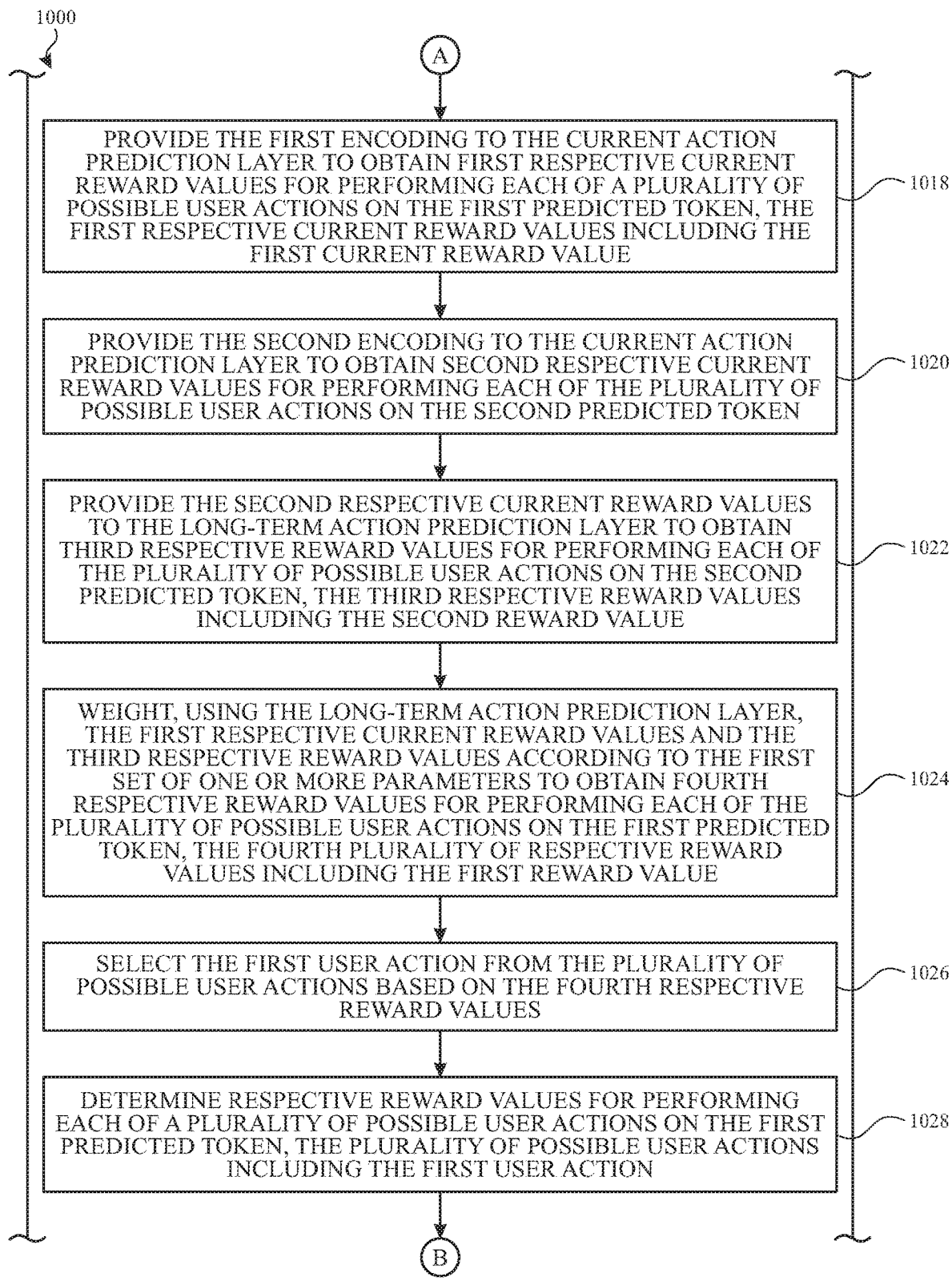
Figure 10C:
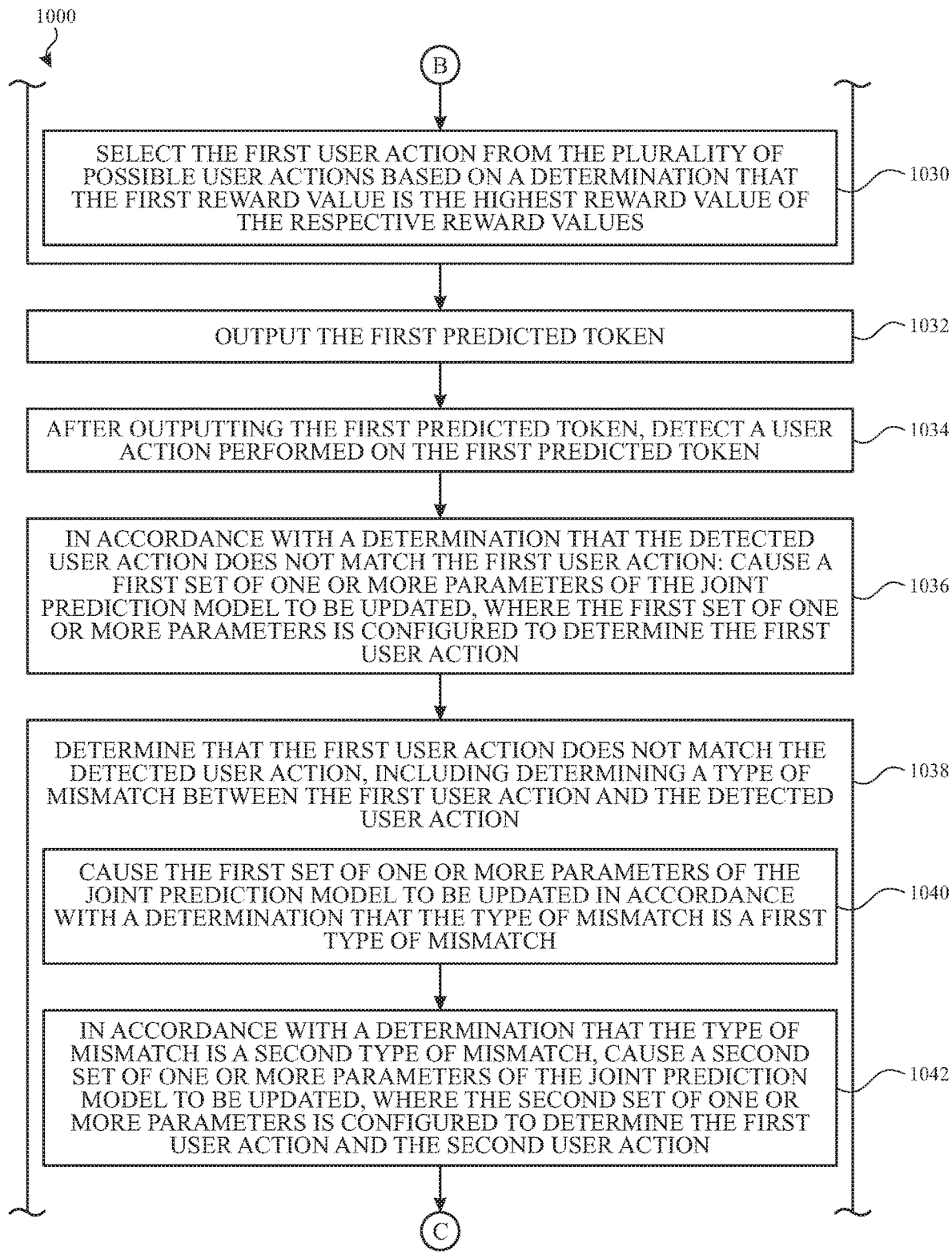
Figure 10D:
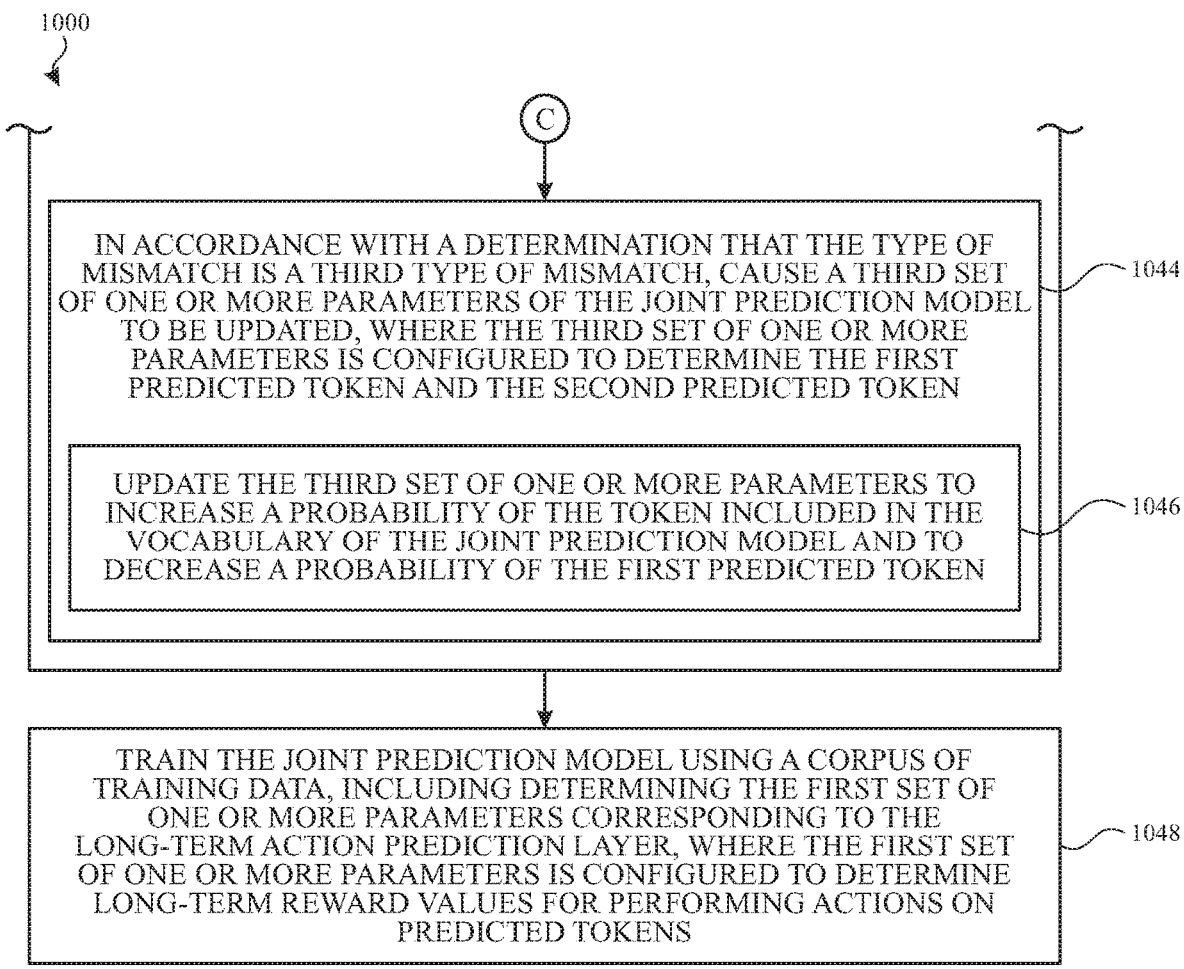

This relates generally to improving text prediction by incorporating user feedback into text prediction models. Below, FIGS. 1A-1B, 2, 3, 4A-4B, and 5A-5B provide a description of exemplary devices for performing the techniques of incorporating user feedback into text prediction models. FIG. 6 illustrates an exemplary system for incorporating user feedback into a joint prediction model (a text prediction model). FIG. 7 illustrates text prediction at an electronic device. FIG. 8 illustrates an example architecture of a joint prediction model. FIG. 9 illustrates reward values for transitioning between states in a Markov Decision Process (MDP) for text and action prediction. FIGS. 6-9 are used to describe the processes described below, including the process of FIGS. 10A-D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
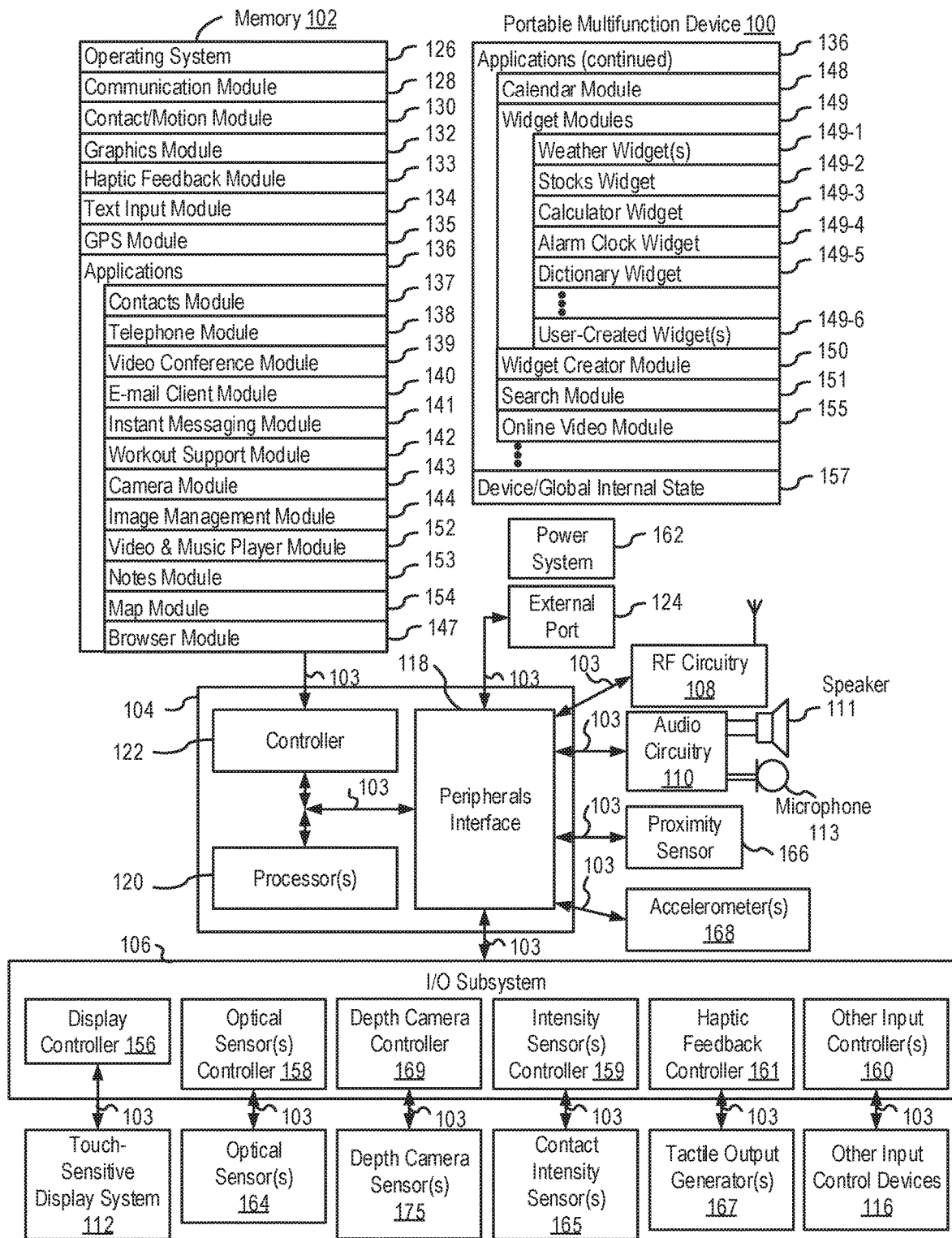
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
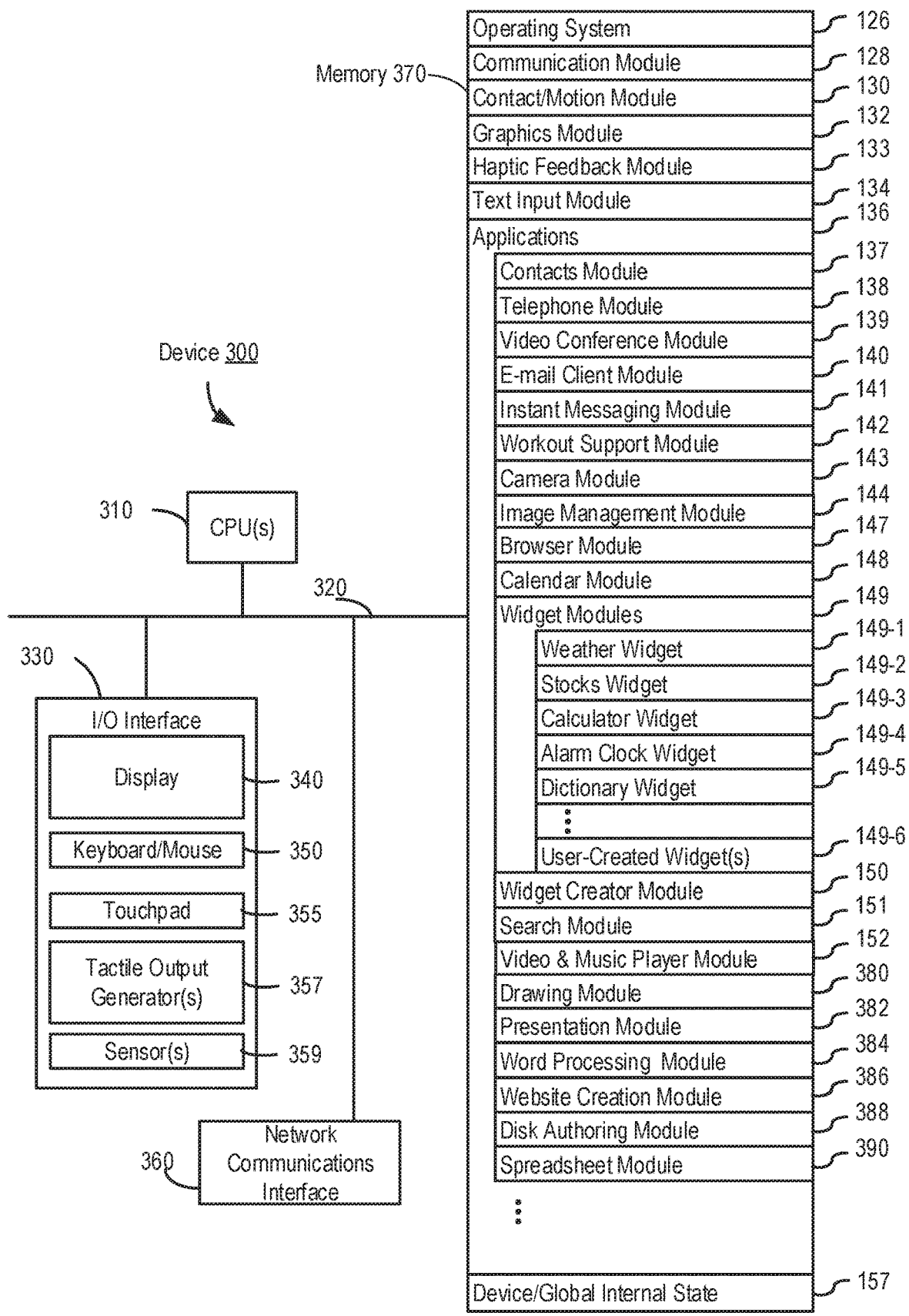
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112: sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book: deleting name(s) from the address book; associating telephone number(s), e-mail address(es), physical address(es) or other information with a name; associating an image with a name; categorizing and sorting names: providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data: calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
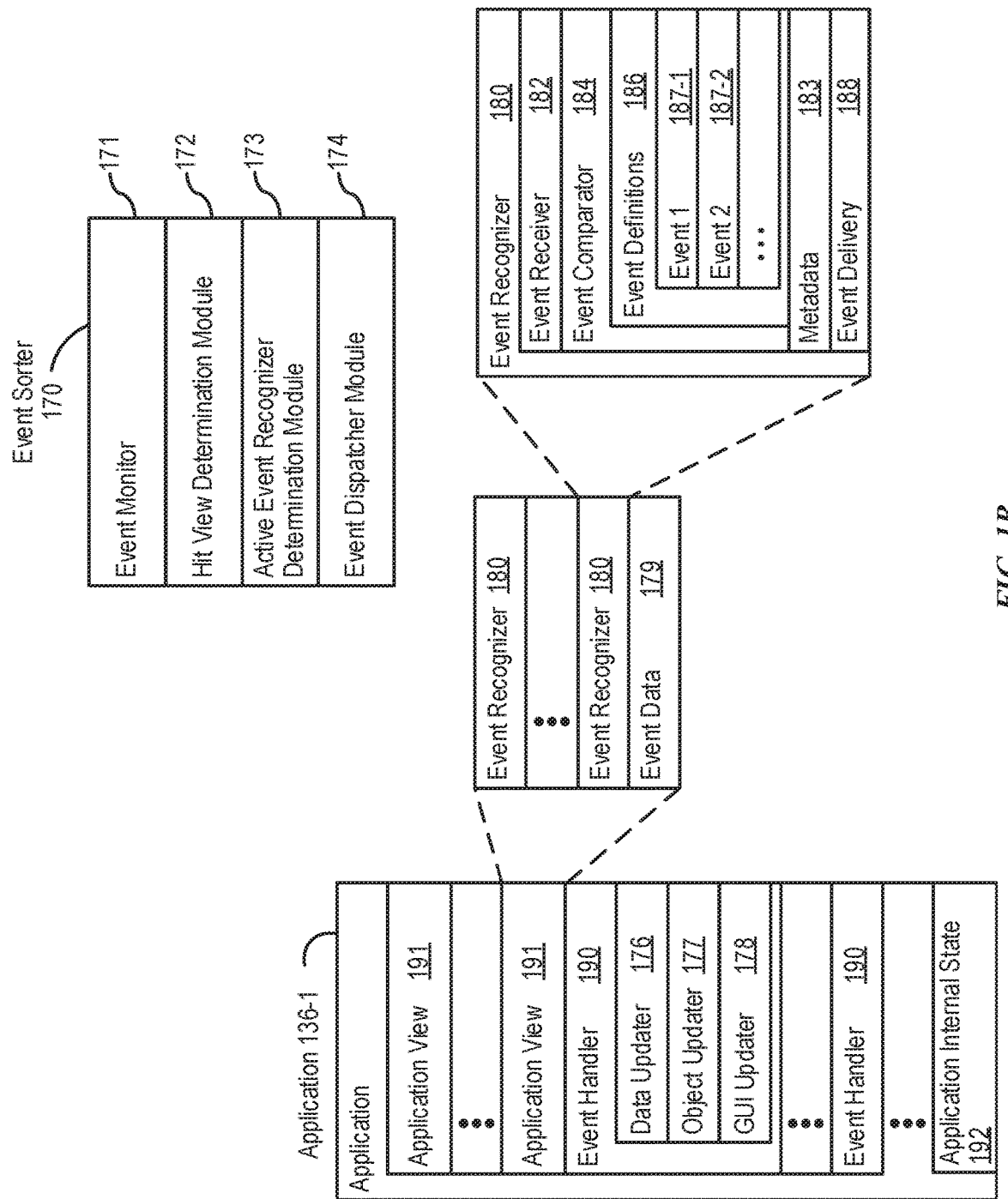
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions: detected eye movements; biometric inputs; and/or any combination thereof are optionally utilized as inputs corresponding to sub-events which define an event to be recognized.

Figure 2:
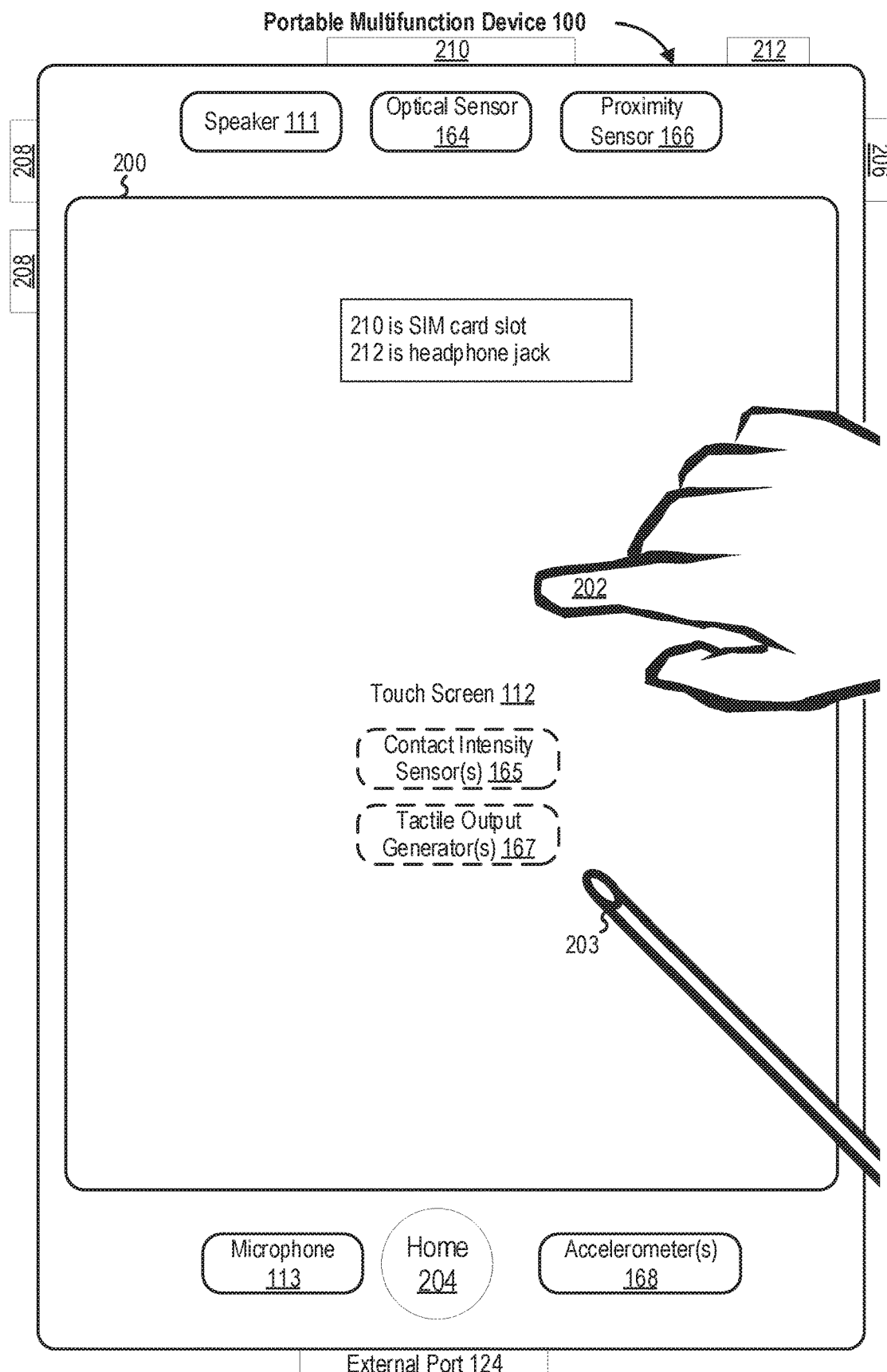
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. 1/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
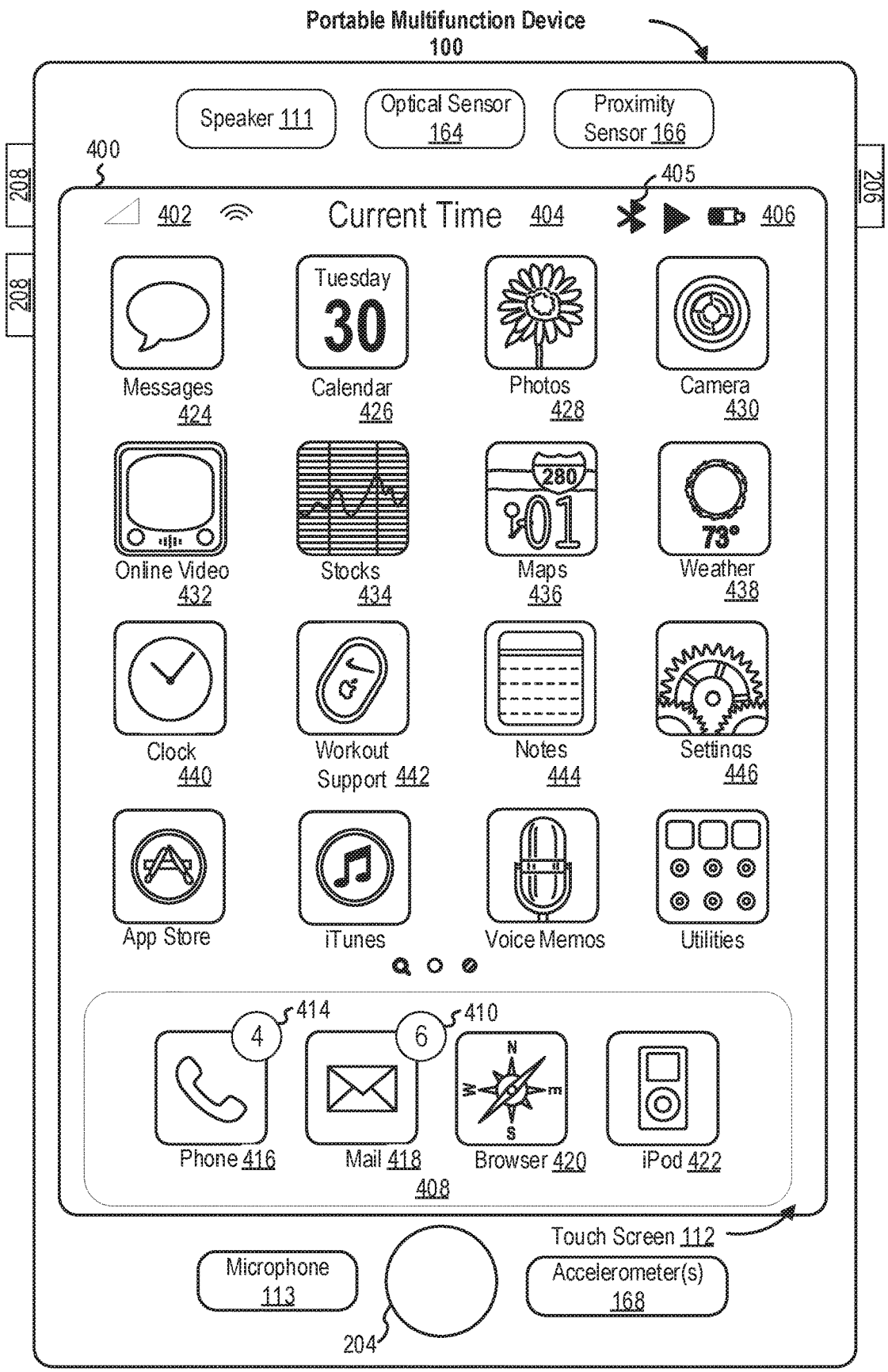
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
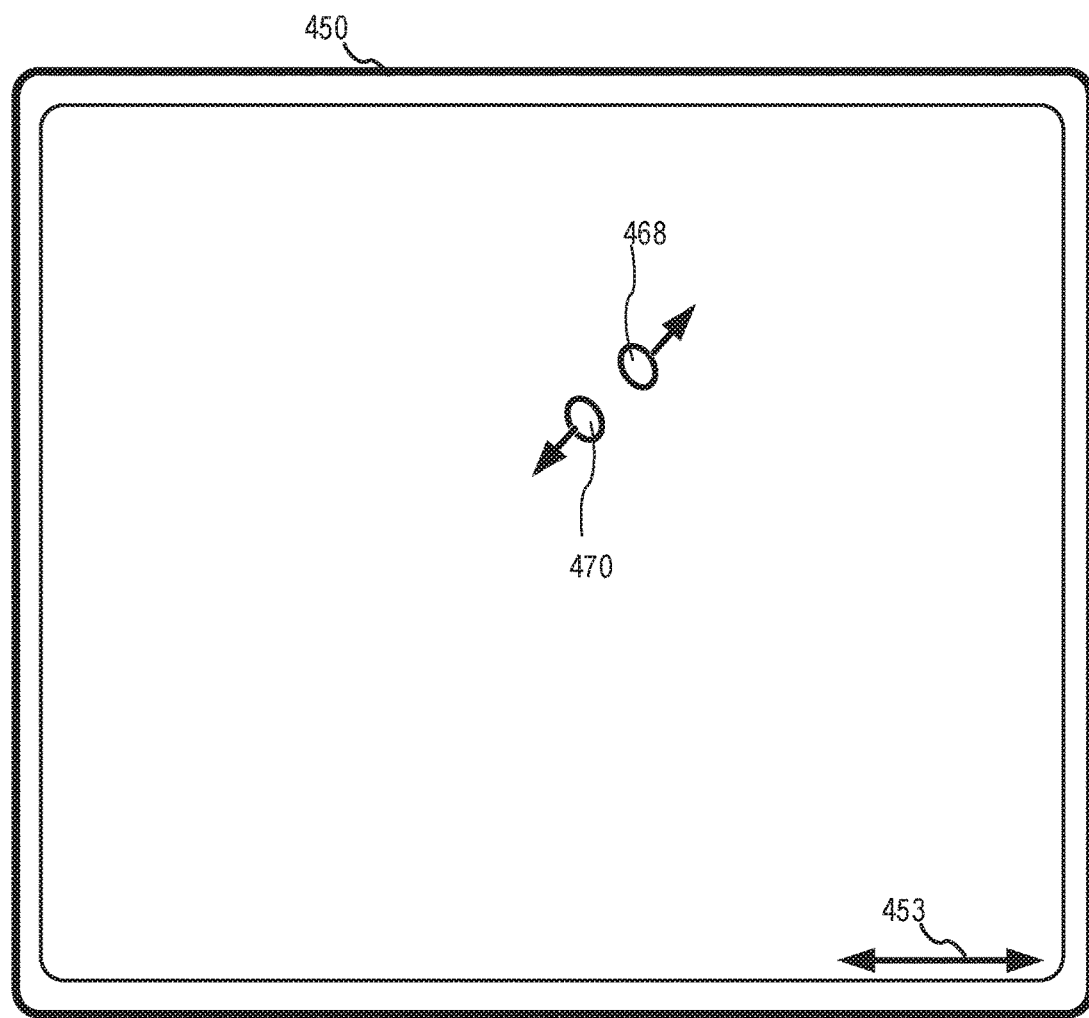
FIG. 4B illustrates an exemplary user interface for a multifunction device with a touch-sensitive surface that is separate from the display in accordance with some embodiments.
Figure 4B:
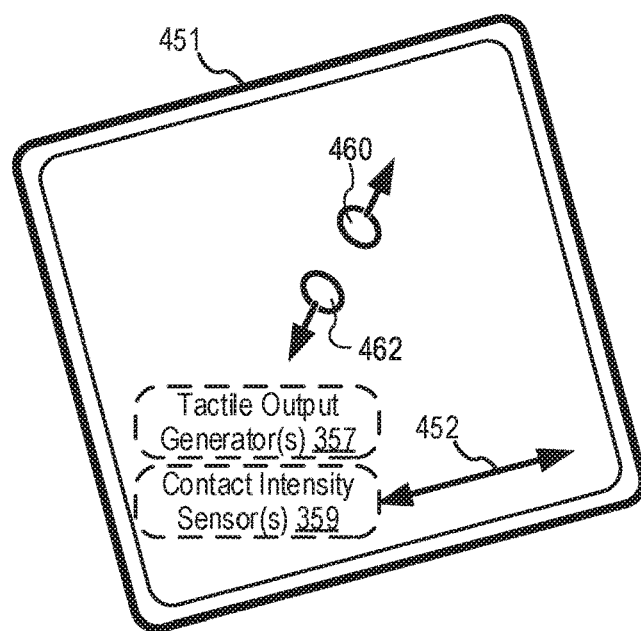

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
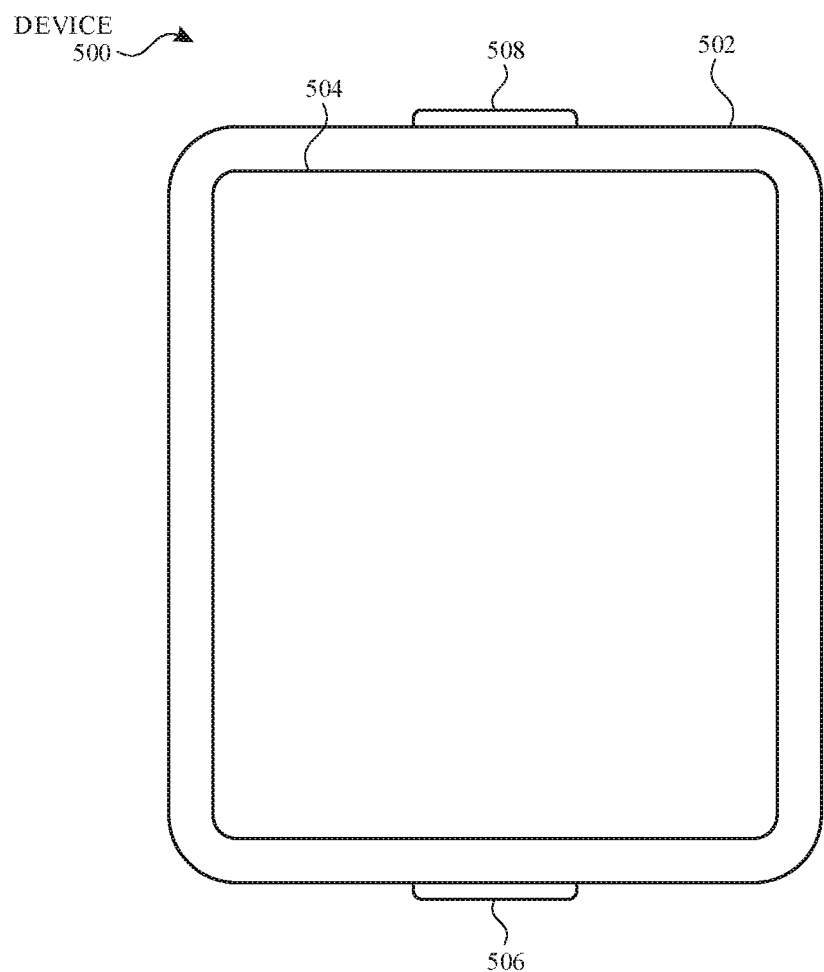
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
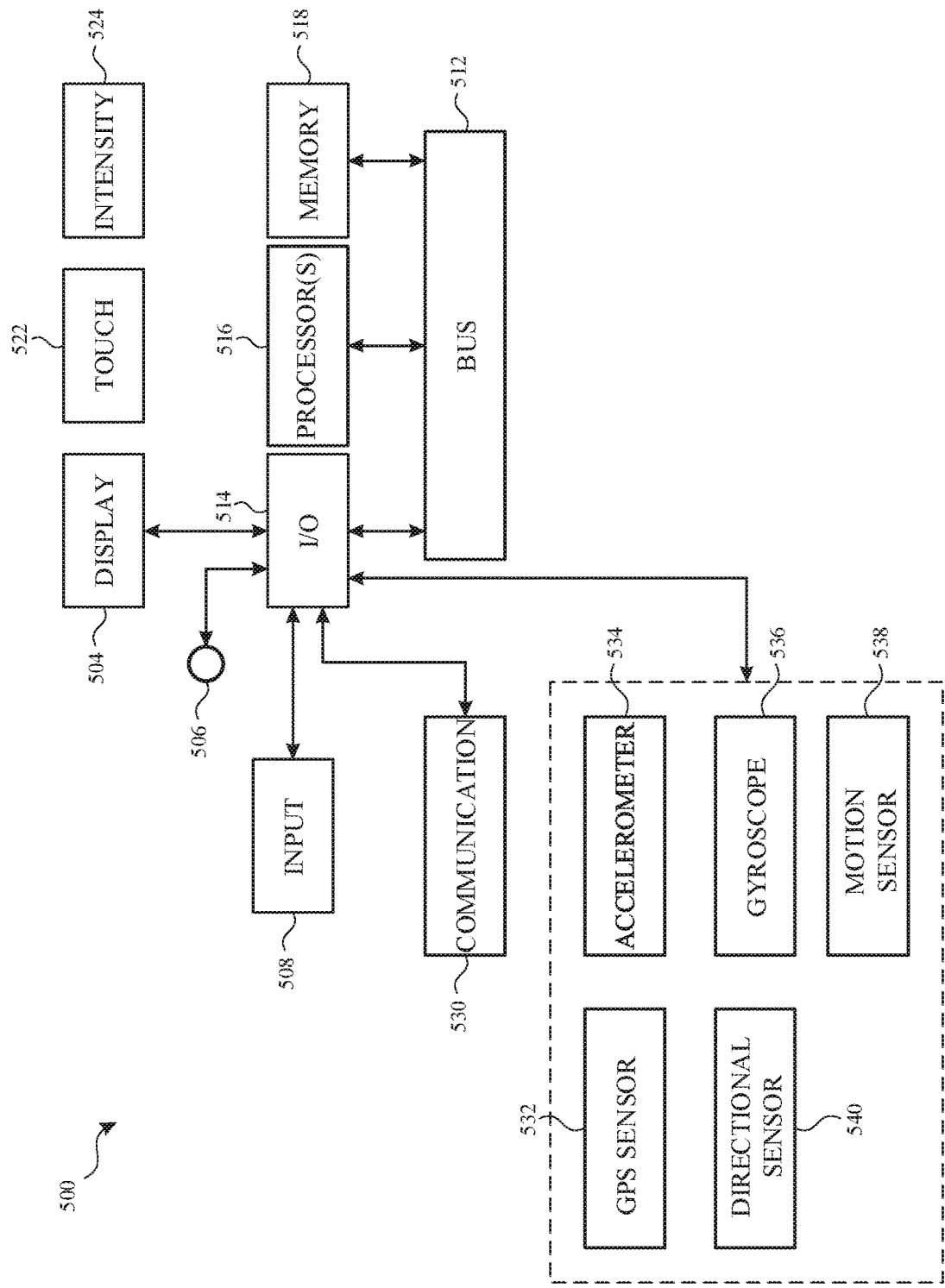
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 1000 (FIGS. 10A-D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates system 600 for incorporating user feedback into a joint prediction model, according to some embodiments. In some embodiments, system 600 is implemented on one or more electronic devices (e.g., 100, 300, or 500) and the components and functions of system 600 may be distributed in any manner between the devices. In some embodiments, system 600 is implemented on one or more server devices having architectures similar to or the same as devices 100, 300, or 500 (e.g., processors, network interfaces, controllers, and memories) but with greater memory, computing, and/or processing resources than devices 100, 300, or 500. In other embodiments, system 600 is implemented according to a client-server architecture, where the components of system 600 are distributed in any manner between one or more client devices (e.g., 100, 300, or 500) and one or more server devices communicatively coupled to the client device(s).

System 600 is implemented using hardware, software, or a combination of hardware and software to carry out the principles discussed herein. Further, system 600 is exemplary, and thus system 600 can have more or fewer components than shown, can combine two or more components, or can have a different configuration or arrangement of the components. Further, although the below discussion describes functions being performed at a single component of system 600, it is to be understood that such functions can be performed at other components of system 600 and that such functions can be performed at more than one component of system 600.

System 600 includes input module 602. Input module 602 obtains one or more input tokens. In some embodiments, input module 602 obtains the one or more input tokens based on user text input at device 100, 300, or 500. In some embodiments, user text input at device 100, 300, or 500 is performed via gesture input (e.g., handwritten input), device keyboard input, speech input (e.g., using a dictation service), peripheral device input, or a combination or sub-combination thereof. For example, FIG. 7 illustrates user input of the text "I want to" via a displayed keyboard of device 100.

In some embodiments, each token of the one or more input tokens includes a respective character, sequence of characters, word fragment (e.g., a portion of a word), word, sequence of words, sentence, or sequence of sentences of the user text input. For example, in FIG. 7, a first input token may be "I," a second input token may be "want," and a third input token may be "to." In embodiments where each token includes a respective word, input module 602 represents each token by determining a vector $w_t$ encoding the respective word as 1-of-N. N is the vocabulary size of joint prediction model 604 discussed below, e.g., the number of different tokens joint prediction model 604 can predict. For example, input module 602 obtains the vector sequence $w_1$, $w_2$, and $w_3$ representing the respective words "I," "want," and "to." Each of $w_1$, $w_2$, and $w_3$ is an N-dimensional vector, e.g., including a value of 1 at the index corresponding to the respective word and a value of 0 at the other indices. In some embodiments, input module 602 provides each obtained token (e.g., provides each vector $w_t$) to joint prediction model 604.

System 600 includes joint prediction model 604 (a text prediction model). Joint prediction model 604 determines (predicts), based on the one or more input tokens, a predicted token and a user action to be performed on the predicted token. In some embodiments, the predicted token is a token following (e.g., consecutive to) the input token(s), a correction of the input token(s), or a completion of the input token(s). Similar to the input token(s), a predicted token includes a character, a sequence of characters, a word fragment, a word, a sequence of words, a sentence, or a sequence of sentences. Accordingly, in some embodiments, joint prediction model 604 predicts, based on user inputted text, a next word (or a corrected or a completed word) and a user action to be performed on the predicted word.

In some embodiments, determined user actions (and the actual user action performed) include actions corresponding to accepting the predicted token or rejecting the predicted token. Example user actions corresponding to accepting the predicted token include selecting the predicted token displayed as a suggestion, inputting the predicted token (e.g., without selecting the predicted token displayed as a suggestion), and not modifying an automatically inputted predicted token (e.g., when the predicted token autocompletes or autocorrects the user inputted text). Example user actions corresponding to rejecting the predicted token include selecting a different (e.g., lower-ranked) predicted token, inputting a different token (from the predicted token) included in the vocabulary of joint prediction model 604, inputting different token not included in the vocabulary, and modifying an automatically inputted predicted token (e.g., when the predicted token autocompletes or autocorrects the user entered text). An example of modifying the predicted token includes the user modifying a portion of the predicted token, such as by retaining the stem of the token but modifying the inflection, e.g., modifying the predicted token "jumped" to "jump." In some embodiments, determined user actions (and the actual user action performed) includes an action ending the token sequence, e.g., sending the token sequence as a message, saving the token sequence in a document, or inputting a character (e.g., a period) ending the token sequence.

For example, FIG. 7 shows that based on the input words "I want to," joint prediction model 604 determines the top-ranked predicted word "run" and the second-ranked predicted word "play." Device 100 displays the predicted words in suggestions bar 702 in an order based on their respective rankings. A user selection of "run" in suggestions bar 702 corresponds to accepting the predicted word "run," while a user selection of "play" in suggestions bar 702 corresponds to rejecting the predicted word "run."

Techniques joint prediction model 604 uses to determine predicted tokens and user actions to be performed on the predicted tokens are now discussed with respect to FIG. 8.

FIG. 8 illustrates an exemplary architecture of joint prediction model 604, according to some embodiments. In some embodiments, joint prediction model 604 includes a neural network, such as a recurrent neural network (RNN), including a token prediction portion 802 and a user action prediction portion 804, each discussed below.

Token prediction portion 802 determines a predicted token based on input token(s) provided by input module 602. Specifically, in some embodiments, given a sequence of input tokens represented by $w_1 \ldots w_t$, token prediction portion 802 determines a representation $w_{t+1}$ of the following predicted token. As discussed, in some embodiments, $w_1 \ldots w_t$ are each encoded as 1-of-N, where N is the vocabulary size of joint prediction model 604. In some embodiments, $w_{t+1}$ is inferred from an N-dimensional vector (output by portion 802) indicating a probability distribution over the vocabulary for the predicted token, e.g., such that the index of the vector with the highest value corresponds to the highest ranked predicted token. For example, in FIG. 7, $w_{t+1}$ indicates the top ranked prediction is "run" and the second ranked prediction is "play."

In some embodiments, token prediction portion 802 includes encoding layer 806. Encoding layer 806 accepts a representation of input token(s) (e.g., $w_1 \ldots w_t$) as input and determines $s_t$, an encoding of the input token(s). In some embodiments, encoding layer 806 includes input layer 808 (parameterized by matrix W) and hidden layer 810 (parameterized by matrix S). In some embodiments, the nodes of hidden layer 810 are implemented as long short-term memory (LSTM) cells. Further, although FIG. 8 shows hidden layer 810 including a single layer, any number of layers may be employed in hidden layer 810.

As shown, encoding layer 806 determines encoding $s_t$ by processing $w_1 \ldots w_t$ using input layer 808 and then using hidden layer 810. Specifically, encoding layer 806 determines $s_t$, an H-dimensional vector for the node values of hidden layer 810, according to:

$$s_t = F\{W \cdot w_t + S \cdot s_{t-1}\}, \quad (1)$$

where $F\{\bullet\}$ denotes a non-linear activation function, such as a sigmoid, hyperbolic tangent, or rectified linear unit.

In some embodiments, token prediction portion 802 includes token prediction layer 812. Token prediction layer 812 accepts an encoding provided by encoding layer 806 as input and determines a predicted token based on the encoding. For example, token prediction layer 812 (parameterized by matrix Y) converts $s_t$ into the N-dimensional vector $w_{t+1}$ (the probability distribution over the vocabulary for the predicted token) according to:

$$w_{t+1} = G\{Y \cdot s_t\}, \quad (2)$$

where $G\{\bullet\}$ denotes the softmax transformation to obtain the probability distribution over the vocabulary.

In some embodiments, to determine the predicted token, the parameters of token prediction portion 802 (the W, S, and Y matrices) are trained to optimize (e.g., minimize) a cost function. An example cost function includes the cross-entropy cost function:

$$\mathcal{H}(W_1^T) = -\sum_{t=1}^{T} \sum_{i=1}^{N} l_{t,i} \log o_{t,i}, \quad (3)$$

where $W_1^T = w_1 \ldots w_t \ldots w_T$ represents a token sequence of length T for a vocabulary of size N, $l_{t,i}$ denotes the intended (correct) token at time t for class i, and $o_{t,i}$ denotes the actual predicted token at time t for class i. $l_{t,i}$ is set to 1 for the class $1 \leq i \leq N$ associated with $w_{t+1}$ (i.e., $w_{t+1}$ represents a token included in the vocabulary), and $l_{t,i}$ is set to 0 otherwise.

User action prediction portion (or layer) 804 determines (predicts) user actions to be performed on predicted tokens. As discussed herein, predicting a user action may better incorporate user feedback and user text entry idiosyncrasies (both represented by user actions) to improve and personalize text prediction models. Particularly, previous techniques for incorporating user feedback/idiosyncrasies into text prediction models may initially rely on a static (not user specific) language model for token prediction. The prediction generated by the static language model may then be modified using a separate dynamic (user-specific) n-gram language model that accounts for the user's feedback to generate the final predicted token. The dynamic n-gram language model may be optimized/updated according to the user's actions performed on entered text, e.g., to account for user-preferred expressions, slang terms, and the like.

However, such previous techniques for incorporating user feedback/idiosyncrasies may be sub-optimal, as the dynamic n-gram language model is not optimized jointly with the static language model. That is, user feedback may only be used to optimize the dynamic language model, not the static language model that generated the original predicted token. Accordingly, rather than having separate language models for text prediction, it may be desirable to optimize a single language model (e.g., model 604) according to the user's feedback. In this manner, predictions generated by the single model can already account for a particular user's feedback/idiosyncrasies to improve the user's text prediction experience.

Reinforcement learning (RL) (specifically imitation learning) provides techniques for incorporating user feedback in predictive models in such manner. In particular, imitation learning techniques train a model to predict a user's actions based on training data indicating the user's observations and user performed actions given the observations. For text and action prediction, model 604 can thus be trained to predict the user's action based on the predicted token and previously inputted tokens (the user's observations). But because predictions generated according to such technique affect future observations, model errors may cause future observations and action predictions to differ from user desired observations/actions, leading to error compounding. For example, if the model incorrectly predicts a user action to confirm a predicted word, the model may then incorrectly predict future user actions assuming the predicted word is correct (when it is not). Such error may be due to the inherent lack of comprehensive training data for text/action prediction. That is, given the vast number of potential combinations of words and user actions performable on such words, it is infeasible for any training dataset to encompass the entirety of such combinations.

A potential technique for avoiding or mitigating such error is predicting actions allowing for correct prediction of future actions and observations. In other words, it may be desirable for model 604 to incorporate long-term planning when predicting actions, meaning that model 604 predicts an action using not only the current observation (e.g., the previous token(s) and predicted token), but also using future observations/actions resulting from performing the predicted action. A Markov Decision Process (MDP) may thus provide a framework for incorporating long-term planning into model 604's action prediction technique. One of skill in the art will appreciate that implementing a MDP includes specifying states, actions performable in a state to transition to a subsequent state, a reward function providing respective rewards (reward values) for performing actions in a state, and a policy specifying the action to perform in each state.

The optimal policy (or solution to the MDP) specifies the optimal action for each state to obtain the maximal cumulative long-term reward, e.g., the maximal sum of each reward attained as the MDP transitions between states.

Accordingly, by implementing and solving a MDP, model 604 may predict optimal actions to attain the maximal cumulative long-term reward. This may avoid or mitigate the error compounding discussed above, resulting in more accurate action prediction. This is in contrast to predicting actions to maximize the current reward, e.g., predicting, for a state, the action having the highest reward, without considering future rewards attainable by performing actions in subsequent states. The following discussion thus describes how, in some embodiments, user action prediction portion 804 implements and solves a MDP to determine optimal user actions.

A starting point for implementing a MDP includes defining states and possible actions. For text and action prediction, a separate state corresponds to each token (including the previous tokens), the initial state corresponds to the beginning of the token sequence, and the final state corresponds to the end of the token sequence. For example, in FIG. 7, a first state corresponds to "I," a second state corresponds to "I want," and a third state corresponds to "I want to," and so on. As FIG. 8 shows, because encoding $s_t$ includes information about the current token $w_t$ and previous tokens up to $w_{t-1}$, encoding $s_t$ represents a state of the MDP at current time t. In FIG. 7, for instance, encoding $s_t$ represents the current state of "I want to."

The possible actions for the MDP are defined as the possible user-performable actions on a predicted token. In some embodiments, the actions include the various actions discussed above, e.g., actions corresponding to accepting or rejecting the predicted token and actions ending the token sequence. For example, in FIG. 7, the action to confirm the top-ranked predicted word "run" transitions the MDP from the state "I want to" to "I want to run." More formally, define $\mathcal{A}$ as the set of K possible user-performable actions. Further define the K-dimensional vector at to indicate, at time t, the probability distribution over the possible actions K. That is, each index of at corresponds to a respective action, and the values of $a_t$ are respective rewards (reward values) for performing the respective actions in state $s_t$. As discussed below, $a_t$ (the current action distribution) indicates current reward values for performing each action. Another K-dimensional vector $q_t$ (the long-term action distribution) indicates long-term reward values for performing each action (meaning an action with a higher long-term reward value provides a higher cumulative reward than an action with a lower long-term reward value).

In some embodiments, user action prediction portion 804 includes current action prediction layer 814. Current action prediction layer 814 (parametrized by matrix A) determines actions to be performed on predicted tokens based on current reward values. In particular, as shown in FIG. 8, layer 814 accepts encoding $s_t$ (of the input token(s) represented by $w_1 \ldots w_t$) as input and determines the current action distribution $a_t$. For example, layer 814 converts the H-dimensional vector $s_t$ into the K-dimensional vector $a_t$ according to:

$$a_t = G\{A \cdot s_t\}, \quad (4)$$

where $G\{\cdot\}$ denotes the softmax transformation. In this manner, layer 814 obtains respective current reward values for performing each of a plurality of possible user actions on a predicted token. For example, in FIG. 7, $a_t$ can indicate the current reward value for confirming "run" (accepting the top ranked prediction) is 0.1, while the current reward value for confirming "play" (rejecting the top ranked prediction) is 0.2.

Portion 802 and layer 814 thus illustrate an exemplary architecture for jointly predicting a token and an user action to be performed on the predicted token (without considering long-term rewards). In some embodiments, to determine the user action, the parameters of layer 814 (the A matrix) are trained to optimize a cost function. An example cost function includes the cross entropy cost function:

$$\mathcal{H}(A_1^T) = -\sum_{t=1}^{T} \sum_{k=1}^{K} l_{t,k} \log o_{t,k}, \quad (5)$$

where $A_1^T = a_1 \ldots a_t \ldots a_T$ represents the sequence of performed actions, $l_{t,k}$ and $o_{t,k}$ are defined according to equation (3), $l_{t,k}$ is set to 1 for the class $1 \leq k \leq K$ associated with $a_t$ (i.e., $a_t$ represents possible user actions), and is set to 0 otherwise. In some embodiments, jointly training portion 802 and layer 814 to perform token prediction and action prediction includes optimizing a weighted sum of the respective cost functions for token prediction and action prediction. For example, jointly training portion 802 and layer 814 includes determining values for the W, S, Y, and A matrices to minimize the weighted sum of equations (3) and (5) according to:

$$\mathcal{H}(W_1^T, A_1^T) = \lambda \cdot \mathcal{H}(W_1^T) + (1-\lambda) \cdot \mathcal{H}(A_1^T), \quad (6)$$

where the scalar $\lambda$ is a weighting parameter tunable to adjust the contribution from the token prediction task and the action prediction task.

FIG. 9 illustrates reward values for transitioning between states in a MDP for text and action prediction, according to some embodiments. Continuing with the example of FIG. 7, FIG. 9 shows the current reward value for confirming "run" from the current state "I want to" is 0.1, while the current reward value for confirming "play" from the current state is 0.2. Upon inspection of FIG. 9, it should be appreciated that predicting the action with the highest current reward value (e.g., confirming "play") may not be optimal. In particular, confirming "play" transitions the MDP to the state "I want to play," while confirming "run" transitions the MDP to the state "I want to run." As shown, the reward attainable from the state "I want to run" (0.8 for confirming "around") is higher than the reward attainable from the state "I want to play" (0.1 for confirming "ball"). Accordingly, the optimal action is to confirm "run" (not "play") from the state "I want to," as such action provides greater attainable cumulative long-term reward (0.1+0.8=0.9, as opposed to 0.2+0.1=0.3 for confirming "play"). Techniques to determine the optimal action are now discussed with respect to long-term action prediction layer 816.

In some embodiments, user action prediction portion 804 includes long-term action prediction layer 816. Long-term action prediction layer 816 (parametrized by matrices B and Z), determines the optimal actions to be performed on predicted tokens. Accordingly, in some embodiments, layer 816 implements a solution to the MDP associated with action prediction.

Implementing a solution to the MDP may require computing the cumulative long-term reward attainable from every state (and selecting the action to attain the highest cumulative long-term reward). For example, in FIG. 9, solving the MDP can determine the optimal action of confirming "run." In some embodiments, computing the cumulative long-term reward includes determining (or approximating) a Q-function defined over the states and possible actions. In particular, the Q-function indicates the reward for taking action a in state s and transitioning to subsequent state s' according to:

$$q(s, a) = r(s, a) + \gamma \cdot \max_{a'} q(s', a'), \quad (7)$$

where r(s, a) denotes the current reward for performing action a in state s, denotes the highest reward attainable from the subsequent state, and $0 \leq \gamma \leq 1$ denotes a factor specifying the weight of long-term rewards. For example, $\gamma \sim 1$ emphasizes long-term rewards when determining actions, while $\gamma \sim 0$ largely ignores long-term rewards. Equation (7) may be rewritten in vector form as:

$$q(s) = r(s) + \gamma \cdot P(s,s') \cdot q(s'), \quad (8)$$

where q and r are each (K×1) vectors with coordinates each associated with a different action in A, and the (K×K) matrix P specifies, for each action in $\mathcal{A}$, the optimal action for the subsequent state. One of skill in the art will appreciate that P represents the transition kernel of the MDP. Further, q is referred to as the "long-term action distribution," as each value of q indicates a long-term reward for performing each action, such that the action with the highest value in q is the optimal action.

Algorithms such as the state-action-reward-state-action (SARSA) algorithm provide an iterative solution for the long-term action distribution:

$$q(s) \leftarrow q(s) + v \cdot [r(s) + \gamma \cdot P(s,s') \cdot q(s') - q(s)], \quad (9)$$

where $[r(s)+\gamma \cdot P(s,s')-q(s')-q(s)]$ represents the difference between the newly obtained information about q(s) (computed according to equation (8)) at the current iteration and the information about q(s) obtained at the previous iteration. $0 \leq v \leq 1$ specifies the extent to which the newly obtained information affects the previously obtained information. For example, $v \sim 1$ means the newly acquired information largely replaces the previously obtained information, while $v \sim 0$ means largely retaining the previously obtained information. The update rule of equation (9) can be shown to converge to the optimal long-term action distribution as the number of iterations approaches infinity.

For joint action and token prediction, each state s uniquely corresponds to a particular time t and each subsequent state s' uniquely corresponds to time t+1. Accordingly, indexing equation (9) by t gives:

$$q_t \leftarrow q_t + v \cdot [r_t + \gamma \cdot P_t \cdot q_{t+1} - q_t], \quad (10)$$

where $q_t$ and $r_t$ are each (K×1) vectors, and $P_t$ is a (K×K) transition kernel matrix specifying the optimal action for the subsequent state (like in equation (8)). To further simply equation (10), define the Bellman operator at time t as:

$$B_t \cdot q = r_t + \gamma \cdot P_t \cdot q, \quad (11)$$

where the matrix $B_t$ is similar to the transition kernel matrix P, but includes an additional column to account for the current rewards $r_t$, giving $B_t$ 2K nonzero entries. Using equation (11), equation (10) becomes:

$$q_t \leftarrow (1-v) \cdot q_t + v \cdot B_t \cdot q_{t+1}. \quad (12)$$

Equation (12) thus indicates that the long-term action distribution $q_t$ (indicating the optimal action at state $s_t$) is obtained as the weighted sum of its current value ($q_t$) and the Bellman transformed version of its next value ($q_{t+1}$).

Because equation (12) is iterative, solving for $q_t$ requires specifying an initial value for $q_t$ before the first iteration. An approximation for the initial value of $q_t$ may rely on the current action distribution $a_t$, as $a_t$ (indicating the current rewards of performing actions) should provide a suitable a priori estimate of $q_t$ (indicating the long-term rewards for performing actions). Specifically, the long-term rewards for performing each action are initially approximated as a weighted sum of the short term rewards for performing each action. This leads to the linear approximation:

$$q_t = Z \cdot a_t, \quad (13)$$

where the matrix Z gives the weights. It should be appreciated that if the current action distribution is close to the long-term action distribution (meaning $a_t$ approximately indicates the optimal action), Z will be close to the identity matrix. Otherwise, Z may include values to distinguish the distributions. Such values provide additional trainable degrees of freedom to represent differences between user action prediction based on current rewards and long-term rewards.

In some embodiments, long-term action prediction layer 816 determines the optimal user action using equations (12) and (13). In particular, FIG. 8 shows that layer 816 determines the long-term action distribution $q_t$ according to:

$$a_t = G\{A \cdot s_t\}; \text{ and} \quad (14)$$

$$q_t = (1-v) \cdot Z \cdot a_t + v \cdot B \cdot q_{t+1}, \quad (15)$$

where the temporal dependence of the $B_t$ matrix is dropped ($B_t = B$) for all times to incorporate the RNN architecture of joint prediction model 604. While such approximation removes any temporal information in matrix B, such approximation increases the number of trainable values of B from O(2K) to O($K^2$). One of skill in the art will appreciate that such additional values (in addition to those available from the Z matrix) may allow more accurate specification of the transition kernel and the reward function of the MDP from training data.

In some embodiments, to determine the optimal user action (e.g., determine $q_t$), the parameters of action prediction portion 804 (the A, Z, and B matrices) are trained to optimize a cost function. An example cost function includes the cross entropy cost function:

$$\mathcal{H}(W_1^T, Q_1^T) = \lambda \cdot \mathcal{H}(W_1^T) + (1-\lambda) \cdot \mathcal{H}(Q_1^T), \quad (16)$$

where $Q_1^T = q_1 \ldots q_t \ldots q_T$ represents the sequence of performed actions, and $\mathcal{H}(Q_1^T)$ is defined analogously to equation (5) (but with $q_t$ instead of $a_t$). $\lambda$ is a tunable weighting parameter representing the contribution from the token prediction task and the long-term action prediction task. In this manner, the solution to the action prediction MDP (e.g., $Q_1^T$) is incorporated into joint prediction model 604, resulting in a single model that incorporates user feedback information when predicting tokens according to imitation learning techniques.

Example processes by which layer 816 determines the optimal user action (according to the above-discussed techniques) are now discussed in greater detail.

In some embodiments, determining the optimal user action includes determining respective reward values (e.g., long-term reward values) for performing each of the possible user actions on a predicted token. For example, layer 816 determines $q_t$, indicating the respective long-term reward values for performing each of the possible user actions. Layer 816 further selects the optimal user action from the possible user actions based on determining the reward value for performing the optimal user action (first reward value) is the highest reward value of the respective reward values. In FIGS. 7 and 9 for instance, $q_t$ indicates the first reward value for confirming "run" is the highest reward value (e.g., higher than the reward value for confirming "play"). Layer 816 thus selects the optimal action of confirming the top-ranked prediction "run." In contrast, as discussed, failure to consider long-term rewards may result in selecting the sub-optimal action to confirm "play" (as confirming "play" provides a higher current reward).

In some embodiments, determining the optimal user action to be performed on a predicted token (represented by $w_{t+1}$) includes determining a second predicted token following the predicted token. For example, as shown in FIG. 8 and equation (15), determining $q_t$ includes determining $q_{t+1}$ (indicating the optimal action for the second predicted token), which in turn includes determining $w_{t+2}$ (representing the second predicted token). In some embodiments, to determine the second predicted token, token prediction portion 802 provides the representation $w_{t+1}$ of the predicted token to encoding layer 806 to obtain an encoding $s_{t+1}$ of the predicted token (as discussed with respect to encoding layer 806). Token prediction portion 802 further provides encoding $s_{t+1}$ to token prediction layer 812 to obtain $w_{t+2}$ representing the second predicted token (as discussed with respect to token prediction layer 812). In other words, to predict the optimal user action for a predicted next token, layer 802 may predict the next-next token (and so on until the end of the token sequence). For example, in FIGS. 7 and 9, $w_{t+1}$ indicates that "run" and "play" are the top-ranked options for the next word. Layer 802 further predicts $w_{t+2}$, indicating that "around" and "ball" are the top-ranked options for the next-next word. This provides the predictions of (among others) "I want to run around" and "I want to play ball."

As discussed, determining the optimal user action include may include determining the first reward value (included in $q_t$) for the optimal user action. As shown in equation (15) and FIG. 8, layer 816 may determine the first reward value based on the current reward value (included in $a_t$) for the optimal user action and a reward value (included in $q_{t+1}$) for performing an action on the second predicted token. In other words, determining the first reward value can include determining the current action distribution $a_t$ for the predicted token and the long-term action distribution $q_{t+1}$ for the second predicted token. Techniques for determining $a_t$ are previously discussed with respect to current action prediction layer 814, and techniques for determining $q_{t+1}$ are now discussed.

As shown in FIG. 8, in some embodiments, determining the long-term action distribution for the second predicted token $q_{t+1}$ includes providing encoding $s_{t+1}$ of the predicted token to current action prediction layer 814. Current action prediction layer 814, determines, based on $s_{t+1}$, $a_{t+1}$ (the current action distribution for the second predicted token) according to the techniques discussed above. Current action prediction layer 814 then provides the distribution $a_{t+1}$ to long-term action prediction layer 816 to obtain the long-term action distribution $q_{t+1}$ for the second predicted token in a manner consistent with the techniques discussed herein. In some embodiments, layer 816 then weights the current action distribution $a_t$ for the predicted token and the long-term action distribution $q_{t+1}$ for the second predicted token to obtain $q_t$, the desired long-term action distribution for the predicted token. For example, layer 816 weights $a_t$ and $q_{t+1}$ using the long-term action prediction parameters (the B and Z matrices) according to equation (15) to obtain the desired $q_t$. Layer 816 then selects the action having the highest corresponding value in $q_t$ as the optimal user action.

Returning to FIG. 6, system 600 includes output module 606. Output module 606 causes tokens predicted by joint prediction model 604 to be output at a device (e.g., 100, 300, or 500). In FIG. 7, for instance, output module 606 causes a predicted token to be displayed as a user-selectable suggestion on a display of device 100. Although FIG. 7 shows that only first predicted token(s) (e.g., next word predictions) are output, in other embodiments, subsequent predicted token(s) (e.g., the next-next word predictions) are output. For example, device 100 may additionally (or alternatively) display "run around" and/or "play ball" as user-selectable suggestions.

In some embodiments, system 600 includes updating module 608. Updating module 608 detects user actions (the actual user actions) performed on predicted tokens. In some embodiments, the user action is detected via a keyboard of an electronic device (e.g., 100, 300, or 500), via speech input (e.g., via a dictation service), via gesture input (e.g., via handwriting recognition), via peripheral device input, or a combination or sub-combination thereof. For example, in FIG. 7, updating module 608 detects whether the user confirms the top-ranked prediction "run" (e.g., selects the displayed suggestion "run") or rejects it (e.g., inputs a different word).

In some embodiments, updating module 608 selectively updates different parameters of joint prediction model 604 based on determining whether the predicted user action matches the detected user action. In some embodiments, if updating module 608 determines that the predicted user action matches the detected user action (meaning model 604 correctly predicted the user action for a predicted word), updating module 608 forgoes updating any parameters of model 604. For example, both the predicted and detected user action may correspond to rejecting a predicted token. This can mean that model 604 has learned, given the input token(s), the user will likely input a token not included in the vocabulary (so any in-vocabulary predicted token is expected to be rejected). As another example, both the predicted and detected user action may correspond to accepting the predicted token. This can mean that model 604 has correctly predicted a token and user satisfaction with the predicted token.

In some embodiments, if updating module 608 determines the predicted user action does not match the detected user action, updating module 608 selectively updates different parameters of model 604 depending on a type of the mismatch. A first type of mismatch includes that the detected user action corresponds to accepting the predicted token and the predicted user action corresponds to rejecting the predicted token. The first type of mismatch means the predicted token was correct, but the predicted action was incorrect. Thus, in some embodiments, if updating module 608 determines the first type of mismatch, updating module 608 updates a set of parameters of model 604 configured to predict the user action (e.g., some or all of the A, B, and Z matrices). In some embodiments, updating such parameters includes backpropagating the sparse vector $a_t'$ (or $q_t'$) indicating the correct (detected) user action through model 604 according to equation (16) to increase the value in $a_t$ or $q_t$ corresponding to the correct user action. Updating the long-term action prediction parameters Z and B involves $O(K^2)$ values, while updating the current action prediction parameters A involves $O(HK)$ values, where $H \gg K$. Accordingly, in some embodiments, updating module 608 only updates the long-term action prediction parameters for the first type of mismatch. In other embodiments, updating module 608 updates both the current and long-term action prediction parameters for the first type of mismatch.

A second type of mismatch includes that that the detected user action corresponds to rejecting the predicted token by inputting an out-of-vocabulary token and that the predicted user action corresponds to accepting the predicted token. The second type of mismatch means the predicted token was irrelevant (as model 604 cannot predict an out-of-vocabulary token) and the predicted action was incorrect. Thus, in some embodiments, updating module 608 updates another set of parameters of model 604 configured to predict the user action, e.g., in a manner analogous to that for the first type of mismatch. In some embodiments, the set of parameters updated for the first type of mismatch differ from the set of parameters updated for the second type of mismatch. For example, the parameters updated for the first type of mismatch are the long-term action prediction parameters B and Z, while the parameters updated for the second type of mismatch are the current action prediction parameters A. In other embodiments, the set of parameters updated for the first and second types of mismatch are identical.

In some embodiments, updating module 608 determines the second type of mismatch if the predicted token (and/or the input token(s)) includes a word or a higher-level processing unit, e.g., a sequence of words, a sentence, and a sequence of sentences. For example, when the predicted token includes a processing unit of a lower level than a word (e.g., a character or a word fragment), the concept of an out-of-vocabulary token does not apply, e.g., as all possible predicted characters may be considered in-vocabulary. Thus, in embodiments where the predicted token (and/or input token(s)) includes a processing unit of a lower level than a word, updating module 608 instead determines a third type of mismatch, discussed below.

A third type of mismatch includes that the detected user action corresponds to rejecting the predicted token by inputting an in-vocabulary token and that the predicted user action corresponds to confirming the predicted token. The third type of mismatch means the predicted token was incorrect (when it could have been correct). Thus, in some embodiments, if updating module 608 determines the third type of mismatch, updating module 608 updates a set of parameters of model 604 configured to predict tokens (e.g., the Y matrix). In some embodiments, updating the set of parameters configured to predict tokens includes updating the parameters to increase a probability (e.g., value in $w_{t+1}$) of the inputted in-vocabulary token and decrease the probability of the predicted token. For example, in FIG. 7, suppose model 604 predicts the user will accept "run," but the user instead inputs the in-vocabulary token "hide." Module 608 thus updates the Y matrix such that for future predictions, given the input tokens "I want to," model 604 determines a lower probability for "run" and a higher probability for "hide."

In some embodiments, updating module 608 trains joint prediction model 604 using a corpus of training data to predict tokens and the optimal user action. For example, updating module 608 trains joint prediction model according to the techniques discussed above, e.g., by minimizing equations (3), (5), and/or (16). In some embodiments, the corpus of training data includes a plurality of datasets each including a user inputted token, a predicted token following the user inputted token, a detected user action performed on the predicted token to obtain an updated token, and a confirmation of the updated token. For example, the training data includes various instances of user inputted words, a next word prediction, a user action performed on the prediction to obtain an updated prediction (which may be the same as the next word prediction if the user action confirms the prediction), and an indication of user satisfaction with the updated prediction, e.g., the user continues to input text without modifying the updated prediction, the user saves or sends the inputted text with the updated prediction, and the like.

In some embodiments, as discussed, training joint prediction model 604 includes determining the long-term action prediction parameters (e.g., B and Z) configured to determine the long-term reward values. One of skill in the art will appreciate that determining the long-term action prediction parameters means the reward function and transition kernel of the MDP for optimal user action prediction can be learned through training data. This may advantageously avoid arbitrarily specifying (e.g., guessing) the reward function and transition kernel (as may be required for previous MDP implementations), thereby improving the accuracy of both user action prediction and text prediction.

FIGS. 10A-D illustrate a flow diagram of process 1000 for incorporating user feedback into a joint prediction model, according to some embodiments. In some embodiments, process 1000 is performed at one or more electronic devices (e.g., 100, 300, 500) each having one or more processors and memory. In some embodiments, process 1000 is performed using a client-server system, with the operations of process 1000 divided up in any manner between the client device(s) (e.g., 100, 300, 500) and the server. Some operations in process 1000 are, optionally, combined, the orders of some operations are, optionally, changed, and some operations are, optionally, omitted.

At block 1002, one or more input tokens are obtained (e.g., by input module 602). In some embodiments, obtaining the one or more input tokens includes obtaining the one or more input tokens based on user input received at a keyboard of an electronic device (e.g., device 100, 300, or 500). In some embodiments, the one or more input tokens each respectively include a character, a sequence of characters, a word fragment, a word, a sequence of words, or a sentence.

At block 1004, a first predicted token following the one or more input tokens and a second predicted token following the first predicted token are determined using a joint prediction model (e.g., model 604) based on the one or more input tokens. In some embodiments, the first predicted token and the second predicted token each respectively include a character, a sequence of characters, a word fragment, a word, a sequence of words, or a sentence. In some embodiments, the joint prediction model includes a neural network including an encoding layer (e.g., layer 806), a token prediction layer (e.g., layer 812); and a user action prediction layer (e.g., layer 804).

In some embodiments, determining the first predicted token and the second predicted token includes providing a representation of the one or more input tokens (e.g., $w_t$ in FIG. 8) to the encoding layer to obtain a first encoding of the one or more input tokens (e.g., $s_t$ in FIG. 8), as shown in block 1006. In some embodiments, determining the first predicted token and the second predicted token includes providing the first encoding to the token prediction layer to obtain the first predicted token (e.g., obtaining $w_{t+1}$ in FIG. 8), as shown in block 1008. In some embodiments, determining the first predicted token and the second predicted token includes providing a representation of the first predicted token (e.g., $w_{t+1}$ in FIG. 8) to the encoding layer to obtain a second encoding of the first predicted token (e.g., $s_{t+1}$ in FIG. 8), as shown in block 1010. In some embodiments, determining the first predicted token and the second predicted token includes providing the second encoding to the token prediction layer to obtain the second predicted token (e.g., obtaining $w_{t+2}$ in FIG. 8), as shown in block 1012.

At block 1014 a first user action to be performed on the first predicted token is determined using the joint prediction model based on the one or more input tokens. In some embodiments, the first user action corresponds to accepting the first predicted token or rejecting the first predicted token. In some embodiments, determining the first user action includes determining a first reward value (e.g., a value in $q_t$ corresponding to the first user action) for performing the first user action based on a first current reward value for performing the first user action (e.g., a value in $a_t$ corresponding to the first user action) and a second reward value for performing a second user action on the second predicted token (e.g., values in $q_{t+1}$), as shown in block 1016.

In some embodiments, the user action prediction layer (e.g., layer 804) includes a current action prediction layer (e.g., layer 814) and a long-term action prediction layer (e.g., layer 816). In some embodiments, determining the first user action includes providing the first encoding (e.g., $s_t$ in FIG. 8) to the current action prediction layer to obtain first respective current reward values for performing each of a plurality of possible user actions on the first predicted token (e.g., obtain $a_t$ in FIG. 8), the first respective current reward values including the first current reward value, as shown in block 1018. In some embodiments, determining the first user action includes providing the second encoding (e.g., $s_{t+1}$ in FIG. 8) to the current action prediction layer to obtain second respective current reward values for performing each of the plurality of possible user actions on the second predicted token (e.g., obtain $a_{t+1}$ in FIG. 8), as shown in block 1020. In some embodiments, determining the first user action includes providing the second respective current reward values to the long-term action prediction layer to obtain third respective reward values for performing each of the plurality of possible user actions on the second predicted token (e.g., obtain $q_{t+1}$ in FIG. 8), the third respective reward values including the second reward value, as shown in block 1022. In some embodiments, determining the first reward value includes weighting, using the long-term action prediction layer, the first respective current reward values (e.g., $a_t$ in FIG. 8) and the third respective reward values (e.g., $q_{t+1}$ in FIG. 8) according to a first set one or more parameters (e.g., the B and/or Z matrices in FIG. 8) to obtain fourth respective reward values for performing each of the plurality of possible user actions on the first predicted token (e.g., obtain $q_t$ in FIG. 8), the fourth plurality of respective reward values including the first reward value, as shown in block 1024. In some embodiments, determining the first user action includes selecting the first user action from the plurality of possible user actions based on the fourth respective reward values, as shown in block 1026.

In some embodiments, determining the first user action further includes determining (e.g., by model 604) respective reward values for performing each of a plurality of possible user actions on the first predicted token, the plurality of possible user actions including the first user action, as shown in block 1028. In some embodiments, determining the first user action further includes selecting (e.g., by model 604) the first user action from the plurality of possible user actions based on a determination that the first reward value is the highest reward value of the respective reward values, as shown in block 1030. In some embodiments, each of the respective reward values is a long-term reward value for performing the respective possible user action on the first predicted token.

At block 1032, the first predicted token is output (e.g., by module 606). In some embodiments, outputting the first predicted token includes displaying, on a display of the electronic device, the first predicted token as a user-selectable suggestion.

At block 1034, after outputting the first predicted token, a user action performed on the first predicted token is detected (e.g., by module 608). In some embodiments, detecting the user action includes detecting the user action via the keyboard. In some embodiments, the detected user action corresponds to accepting the first predicted token or rejecting the first predicted token.

At block 1036, in some embodiments, in accordance with a determination (e.g., by module 608) that the detected user action does not match the first user action, a first set of one or more parameters of the joint prediction model (e.g., the long-term action prediction parameters Z and B in FIG. 8 and/or the current action prediction parameters A in FIG. 8) is caused to be updated (e.g., by module 608), where the first set of one or more parameters is configured to determine the first user action.

At block 1038, in some embodiments, it is determined (e.g., by module 608) that the first user action does not match the detected user action. Determining that the first user action does not match the detected user action includes determining (e.g., by module 608) a type of mismatch between the first user action and the detected user action. In some embodiments, causing the first set of one or more parameters of the joint prediction model to be updated is performed in accordance with a determination that the type of mismatch is a first type of mismatch, as shown in block 1040. In some embodiments, the first type of mismatch includes that the detected user action corresponds to confirming the first predicted token and the first user action corresponds to rejecting the first predicted token.

At block 1042, in some embodiments, in accordance with a determination that the type of mismatch is a second type of mismatch, a second set of one or more parameters of the joint prediction model (e.g., the long-term action prediction parameters Z and B in FIG. 8 and/or the current action prediction parameters A in FIG. 8) is caused to be updated (e.g., by module 608), where the second set of one or more parameters is configured to determine the first user action and the second user action. In some embodiments, the second type of mismatch includes that the detected user action corresponds to rejecting the first predicted token by inputting a token not included in a vocabulary of the joint prediction model and that the first user action corresponds to accepting the first predicted token. In some embodiments, the second type of mismatch is determined if the first predicted token includes a word or a higher-level processing unit, e.g., a sequence of words or a sentence.

At block 1044, in some embodiments, in accordance with a determination that the type of mismatch is a third type of mismatch, a third set of one or more parameters of the joint prediction model (e.g., the token prediction parameters Y in FIG. 8) is caused to be updated (e.g., by module 608), where the third set of one or more parameters is configured to determine the first predicted token and the second predicted token. In some embodiments, the third type of mismatch includes that the detected user action corresponds to rejecting the first predicted token by inputting a token included in a vocabulary of the joint prediction model and that the first user action corresponds to confirming the first predicted token. In some embodiments, causing the third set of one or more parameters of the joint prediction model to be updated includes updating (e.g., by module 608) the third set of one or more parameters to increase a probability of the token included in the vocabulary of the joint prediction model and to decrease a probability of the first predicted token, as shown in block 1046.

At block 1048, in some embodiments, the joint prediction model is trained (e.g., by module 608) using a corpus of training data. Training the joint prediction model includes determining the first set of one or more parameters corresponding to the long-term action prediction layer, where the first set of one or more parameters is configured to determine long-term reward values for performing actions on predicted tokens (e.g., determine $q_t$). In some embodiments, the corpus of training data includes a plurality of datasets each including: a user inputted token; a predicted token following the user inputted token; a second detected user action performed on the predicted token to obtain an updated token; and a confirmation of the updated token.

The operations described above with reference to FIGS. 10A-D are optionally implemented by components depicted in FIGS. 6 and 8. For example, the operations of process 1000 may be implemented by input module 602, joint prediction model 604, output module 606, updating module 608, or a combination or sub-combination thereof. It would be clear to a person having ordinary skill in the art how other processes are implemented based on the components depicted in FIG. 6.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of an electronic device, cause the electronic device to:
   obtain one or more input tokens;
   determine, using a joint prediction model, based on the one or more input tokens:
      a first predicted token following the one or more input tokens and a second predicted token following the first predicted token; and
      a first user action to be performed on the first predicted token, wherein determining the first user action includes:
         determining a first reward value for performing the first user action based on a first current reward value for performing the first user action and a second reward value for performing a second user action on the second predicted token;
   output the first predicted token;
   after outputting the first predicted token, detect a user action performed on the first predicted token; and
   in accordance with a determination that the detected user action does not match the first user action:
      cause a first set of one or more parameters of the joint prediction model to be updated, wherein the first set of one or more parameters is configured to determine the first user action.

2. The non-transitory computer-readable storage medium of claim 1, wherein:
   obtaining the one or more input tokens includes obtaining the one or more input tokens based on user input received at a keyboard of the electronic device; and
   detecting the user action includes detecting the user action via the keyboard.

3. The non-transitory computer-readable storage medium of claim 1, wherein outputting the first predicted token includes displaying, on a display of the electronic device, the first predicted token as a user-selectable suggestion.

4. The non-transitory computer-readable storage medium of claim 1, wherein the one or more input tokens, the first predicted token, and the second predicted token each respectively include a character, a sequence of characters, a word fragment, a word, a sequence of words, or a sentence.

5. The non-transitory computer-readable storage medium of claim 1, wherein determining the first user action further includes:
   determining respective reward values for performing each of a plurality of possible user actions on the first predicted token, the plurality of possible user actions including the first user action; and
   selecting the first user action from the plurality of possible user actions based on a determination that the first reward value is the highest reward value of the respective reward values.

6. The non-transitory computer-readable storage medium of claim 5, wherein each of the respective reward values is a long-term reward value for performing the respective possible user action on the first predicted token.

7. The non-transitory computer-readable storage medium of claim 1, wherein:
the first user action corresponds to accepting the first predicted token or rejecting the first predicted token; and
the detected user action corresponds to accepting the first predicted token or rejecting the first predicted token.

8. The non-transitory computer-readable storage medium of claim 1, wherein the one or more programs further comprise instructions, which when executed by the one or more processors, cause the electronic device to:
determine that the first user action does not match the detected user action, including determining a type of mismatch between the first user action and the detected user action; and
wherein causing the first set of one or more parameters of the joint prediction model to be updated is performed in accordance with a determination that the type of mismatch is a first type of mismatch.

9. The non-transitory computer-readable storage medium of claim 8, wherein the first type of mismatch includes that the detected user action corresponds to confirming the first predicted token and the first user action corresponds to rejecting the first predicted token.

10. The non-transitory computer-readable storage medium of claim 8, wherein the one or more programs further comprise instructions, which when executed by the one or more processors, cause the electronic device to:
in accordance with a determination that the type of mismatch is a second type of mismatch, cause a second set of one or more parameters of the joint prediction model to be updated, wherein the second set of one or more parameters is configured to determine the first user action and the second user action.

11. The non-transitory computer-readable storage medium of claim 10, wherein the second type of mismatch includes:
that the detected user action corresponds to rejecting the first predicted token by inputting a token not included in a vocabulary of the joint prediction model; and
that the first user action corresponds to accepting the first predicted token.

12. The non-transitory computer-readable storage medium of claim 8, wherein the one or more programs further comprise instructions, which when executed by the one or more processors, cause the electronic device to:
in accordance with a determination that the type of mismatch is a third type of mismatch, cause a third set of one or more parameters of the joint prediction model to be updated, wherein the third set of one or more parameters is configured to determine the first predicted token and the second predicted token.

13. The non-transitory computer-readable storage medium of claim 12, wherein the third type of mismatch includes:
that the detected user action corresponds to rejecting the first predicted token by inputting a token included in a vocabulary of the joint prediction model; and
that the first user action corresponds to confirming the first predicted token.

14. The non-transitory computer-readable storage medium of claim 13, wherein causing the third set of one or more parameters of the joint prediction model to be updated includes updating the third set of one or more parameters to increase a probability of the token included in the vocabulary of the joint prediction model and to decrease a probability of the first predicted token.

15. The non-transitory computer-readable storage medium of claim 1, wherein the joint prediction model includes a neural network comprising:
an encoding layer;
a token prediction layer; and
a user action prediction layer.

16. The non-transitory computer-readable storage medium of claim 15, wherein determining the first predicted token and the second predicted token includes:
providing a representation of the one or more input tokens to the encoding layer to obtain a first encoding of the one or more input tokens;
providing the first encoding to the token prediction layer to obtain the first predicted token;
providing a representation of the first predicted token to the encoding layer to obtain a second encoding of the first predicted token; and
providing the second encoding to the token prediction layer to obtain the second predicted token.

17. The non-transitory computer-readable storage medium of claim 16, wherein the user action prediction layer includes a current action prediction layer and a long-term action prediction layer, and wherein determining the first user action includes:
providing the first encoding to the current action prediction layer to obtain first respective current reward values for performing each of a plurality of possible user actions on the first predicted token, the first respective current reward values including the first current reward value;
providing the second encoding to the current action prediction layer to obtain second respective current reward values for performing each of the plurality of possible user actions on the second predicted token;
providing the second respective current reward values to the long-term action prediction layer to obtain third respective reward values for performing each of the plurality of possible user actions on the second predicted token, the third respective reward values including the second reward value;
wherein determining the first reward value includes weighting, using the long-term action prediction layer, the first respective current reward values and the third respective reward values according to the first set of one or more parameters to obtain fourth respective reward values for performing each of the plurality of possible user actions on the first predicted token, the fourth plurality of respective reward values including the first reward value; and
selecting the first user action from the plurality of possible user actions based on the fourth respective reward values.

18. The non-transitory computer-readable storage medium of claim 17, wherein the one or more programs further comprise instructions, which when executed by the one or more processors, cause the electronic device to:
train the joint prediction model using a corpus of training data, including:
determining the first set of one or more parameters corresponding to the long-term action prediction layer, wherein the first set of one or more parameters is configured to determine long-term reward values for performing actions on predicted tokens.

19. The non-transitory computer-readable storage medium of claim 18, wherein the corpus of training data includes a plurality of datasets each comprising:
   a user inputted token;
   a predicted token following the user inputted token;
   a second detected user action performed on the predicted token to obtain an updated token; and
   a confirmation of the updated token.

20. An electronic device, comprising:
   one or more processors;
   a memory; and
   one or more programs, wherein the one or more programs are stored in the memory and configured to be executed by the one or more processors, the one or more programs including instructions for:
      obtaining one or more input tokens;
      determining, using a joint prediction model, based on the one or more input tokens:
         a first predicted token following the one or more input tokens and a second predicted token following the first predicted token; and
         a first user action to be performed on the first predicted token, wherein determining the first user action includes:
            determining a first reward value for performing the first user action based on a first current reward value for performing the first user action and a second reward value for performing a second user action on the second predicted token;
      outputting the first predicted token;
      after outputting the first predicted token, detecting a user action performed on the first predicted token; and
      in accordance with a determination that the detected user action does not match the first user action:
         causing a first set of one or more parameters of the joint prediction model to be updated, wherein the first set of one or more parameters is configured to determine the first user action.

21. The electronic device of claim 20, wherein:
   obtaining the one or more input tokens includes obtaining the one or more input tokens based on user input received at a keyboard of the electronic device; and
   detecting the user action includes detecting the user action via the keyboard.

22. The electronic device of claim 20, wherein outputting the first predicted token includes displaying, on a display of the electronic device, the first predicted token as a user-selectable suggestion.

23. The electronic device of claim 20, wherein the one or more input tokens, the first predicted token, and the second predicted token each respectively include a character, a sequence of characters, a word fragment, a word, a sequence of words, or a sentence 24. The electronic device of claim 20, wherein determining the first user action further includes:
   determining respective reward values for performing each of a plurality of possible user actions on the first predicted token, the plurality of possible user actions including the first user action; and
   selecting the first user action from the plurality of possible user actions based on a determination that the first reward value is the highest reward value of the respective reward values.

25. The electronic device of claim 24, wherein each of the respective reward values is a long-term reward value for performing the respective possible user action on the first predicted token.

26. The electronic device of claim 20, wherein:
   the first user action corresponds to accepting the first predicted token or rejecting the first predicted token; and
   the detected user action corresponds to accepting the first predicted token or rejecting the first predicted token.

27. The electronic device of claim 20, wherein the one or more programs further include instructions for:
   determining that the first user action does not match the detected user action, including determining a type of mismatch between the first user action and the detected user action; and
   wherein causing the first set of one or more parameters of the joint prediction model to be updated is performed in accordance with a determination that the type of mismatch is a first type of mismatch.

28. The electronic device of claim 27, wherein the first type of mismatch includes that the detected user action corresponds to confirming the first predicted token and the first user action corresponds to rejecting the first predicted token.

29. The electronic device of claim 27, wherein the one or more programs further include instructions for:
   in accordance with a determination that the type of mismatch is a second type of mismatch, causing a second set of one or more parameters of the joint prediction model to be updated, wherein the second set of one or more parameters is configured to determine the first user action and the second user action.

30. The electronic device of claim 29, wherein the second type of mismatch includes:
   that the detected user action corresponds to rejecting the first predicted token by inputting a token not included in a vocabulary of the joint prediction model; and
   that the first user action corresponds to accepting the first predicted token.

31. The electronic device of claim 27, wherein the one or more programs further include instructions for:
   in accordance with a determination that the type of mismatch is a third type of mismatch causing a third set of one or more parameters of the joint prediction model to be updated, wherein the third set of one or more parameters is configured to determine the first predicted token and the second predicted token.

32. The electronic device of claim 31, wherein the third type of mismatch includes:
   that the detected user action corresponds to rejecting the first predicted token by inputting a token included in a vocabulary of the joint prediction model; and
   that the first user action corresponds to confirming the first predicted token.

33. The electronic device of claim 32, wherein causing the third set of one or more parameters of the joint prediction model to be updated includes updating the third set of one or more parameters to increase a probability of the token included in the vocabulary of the joint prediction model and to decrease a probability of the first predicted token 34. The electronic device of claim 20, wherein the joint prediction model includes a neural network comprising:
   an encoding layer;
   a token prediction layer; and
   a user action prediction layer.

35. The electronic device of claim 34, wherein determining the first predicted token and the second predicted token includes:
providing a representation of the one or more input tokens to the encoding layer to obtain a first encoding of the one or more input tokens;
providing the first encoding to the token prediction layer to obtain the first predicted token;
providing a representation of the first predicted token to the encoding layer to obtain a second encoding of the first predicted token; and
providing the second encoding to the token prediction layer to obtain the second predicted token.

36. The electronic device of claim 35, wherein the user action prediction layer includes a current action prediction layer and a long-term action prediction layer, and wherein determining the first user action includes:
providing the first encoding to the current action prediction layer to obtain first respective current reward values for perfonning each of a plurality of possible user actions on the first predicted token, the first respective current reward values including the first current reward value;
providing the second encoding to the current action prediction layer to obtain second respective current reward values for performing each of the plurality of possible user actions on the second predicted token;
providing the second respective current reward values to the long-term action prediction layer to obtain third respective reward values for performing each of the plurality of possible user actions on the second predicted token, the third respective reward values including the second reward value;
wherein determining the first reward value includes weighting, using the long-term action prediction layer, the first respective current reward values and the third respective reward values according to the first set of one or more parameters to obtain fourth respective reward values for performing each of the plurality of possible user actions on the first predicted token, the fourth plurality of respective reward values including the first reward value; and
selecting the first user action from the plurality of possible user actions based on the fourth respective reward values.

37. The electronic device of claim 36, wherein the one or more programs further include instructions for:
training the joint prediction model using a corpus of training data, including:
determining the first set of one or more parameters corresponding to the long-term action prediction layer, wherein the first set of one or more parameters is configured to determine long-term reward values for performing actions on predicted tokens.

38. The electronic device of claim 37, wherein the corpus of training data includes a plurality of datasets each comprising:
a user inputted token;
a predicted token following the user inputted token;
a second detected user action pertonried on the predicted token to obtain an updated token; and
a confirmation of the updated token.

39. A method, comprising:
at an electronic device with one or more processors and memory:
obtaining one or more input tokens;
determining, using a joint prediction model, based on the one or more input tokens:
a first predicted token following the one or more input tokens and a second predicted token following the first predicted token; and
a first user action to be performed on the first predicted token, wherein determining the first user action includes:
determining a first reward value for performing the first user action based on a first current reward value for performing the first user action and a second reward value for performing a second user action on the second predicted token;
outputting the first predicted token;
after outputting the first predicted token, detecting a user action performed on the first predicted token; and
in accordance with a determination that the detected user action does not match the first user action:
causing a first set of one or more parameters of the joint prediction model to be updated, wherein the first set of one or more parameters is configured to determine the first user action.

40. The method of claim 39, wherein:
obtaining the one or more input tokens includes obtaining the one or more input tokens based on user input received at a keyboard of the electronic device; and
detecting the user action includes detecting the user action via the keyboard.

41. The method of claim 39, wherein outputting the first predicted token includes displaying, on a display of the electronic device, the first predicted token as a user-selectable suggestion.

42. The method of claim 39, wherein the one or more input tokens, the first predicted token, and the second predicted token each respectively include a character, a sequence of characters, a word fragment, a word, a sequence of words, or a sentence.

43. The method of claim 39, wherein determining the first user action further includes:
determining respective reward values for performing each of a plurality of possible user actions on the first predicted token, the plurality of possible user actions including the first user action; and
selecting the first user action from the plurality of possible user actions based on a determination that the first reward value is the highest reward value of the respective reward values.

44. The method of claim 43, wherein each of the respective reward values is a long-term reward value for performing the respective possible user action on the first predicted token.

45. The method of claim 39, wherein:
the first user action corresponds to accepting the first predicted token or rejecting the first predicted token; and
the detected user action corresponds to accepting the first predicted token or rejecting the first predicted token.

46. The method of claim 39, further comprising:
determining that the first user action does not match the detected user action, including determining a type of mismatch between the first user action and the detected user action; and
wherein causing the first set of one or more parameters of the joint, prediction model to be updated is performed in accordance with a determination that the type of mismatch is a first type of mismatch.

47. The method of claim 46, wherein the first type of mismatch includes that the detected user action corresponds to confirming the first predicted token and the first user action corresponds to rejecting the first predicted token.

48. The method of claim 46, further comprising:
in accordance with a determination that the type of mismatch is a second type of mismatch, causing a second set of one or more parameters of the joint prediction model to be updated, wherein the second set of one or more parameters is configured to determine the first user action and the second user action.

49. The method of claim 48, wherein the second type of mismatch includes:
that the detected user action corresponds to rejecting the first predicted token by inputting a token not included in a vocabulary of the joint prediction model; and
that the first user action corresponds to accepting the first predicted token.

50. The method of claim 46, further comprising:
in accordance with a determination that the type of mismatch is a third type of mismatch causing a third set of one or more parameters of the joint prediction model to be updated wherein the third set of one or more parameters is configured to determine the first predicted token and the second predicted token.

51. The method of claim 50, wherein the third type of mismatch includes:
that the detected user action corresponds to rejecting the tirst predicted token by inputting a token included in a vocabulary of the joint prediction model; and
that the first user action corresponds to confirming the fist predicted token.

52. The method of claim 51, wherein causing the third set of one or more parameters of the joint prediction model to be updated includes updating the third set of one or more parameters to increase a probability of the token included in the vocabulary of the joint prediction model and to decrease a probability of the first predicted token.

53. The method of claim 39, wherein the joint prediction model includes a neural network comprising:
an encoding layer;
a token prediction layer; and
a user action prediction layer.

54. The method of claim 53, wherein determining the first predicted token and the second predicted token includes:
providing a representation of the one or more input tokens to the encoding layer to obtain a first encoding of the one or more input tokens;
providing the first encoding to the token prediction layer to obtain the first predicted token;
providing a representation of the first predicted token to the encoding layer to obtain a second encoding of the first predicted token; and
providing the second encoding to the token prediction layer to obtain the second predicted token.

55. The method of claim 54, wherein the user action prediction layer includes a current action prediction layer and a long-term action prediction layer, and wherein determining the first user action includes:
providing the tirst encoding to the current action prediction layer to obtain first respective current reward values for performing each of a plurality of possible user actions on the first predicted token the first respective current reward values including the first current reward value;
providing the second encoding to the current action prediction layer to obtain second respective current reward values for performing each of the plurality of possible user actions on the second predicted token;
providing the second respective current reward values to the long-term action prediction layer to obtain third respective reward values for performing each of the plurality of possible user actions on the second predicted token the third respective reward values including the second reward value;
wherein determining the first reward value includes weighting using the long-term action prediction layer, the first respective current reward values and the third respective reward values according to the first set of one or more parameters to obtain fourth respective reward values for performing each of the plurality of possible user actions on the first predicted token, the fourth plurality of respective reward values including the first reward value; and
selecting the first user action from the plurality of possible user actions based on the fourth respective reward values.

56. The method ofelairn 55, further comprising:
training the joint prediction model using a corpus of training data, including:
determining the first set of one or more parameters corresponding to the long-term action prediction layer, wherein the first set of one or more parameters is configured to determine long-term reward values for performing actions on predicted tokens.

57. The method of claim 56, wherein the corpus of training data includes a plurality of datasets each comprising:
a user inputted token;
a predicted token following the user inputted token;
a second detected user action perihrnied on the predicted token to obtain an updated token; and
a confirmation of the updated token.

* * * * *

UNITED STATES PATENT AND TRADEMARK OFFICE
CERTIFICATE OF CORRECTION

| | |
|---|---|
| PATENT NO. | : 11,181,988 B1 |
| APPLICATION NO. | : 17/008265 |
| DATED | : November 23, 2021 |
| INVENTOR(S) | : Jerome R. Bellegarda et al. |

It is certified that error appears in the above-identified patent and that said Letters Patent is hereby corrected as shown below:

In the Claims

Claim 23, Column 45, Line 57, after "sentence" insert -- . --.
Claim 25, Column 46, Line 1, delete "ofthe" and insert -- of the --, therefor.
Claim 25, Column 46, Line 2, delete "vaiues" and insert -- values --, therefor.
Claim 27, Column 46, Line 11, delete "ciaim" and insert -- claim --, therefor.
Claim 28, Column 46, Line 22, delete "eiectronic" and insert -- electronic --, therefor.
Claim 28, Column 46, Line 22, delete "tirst" and insert -- first --, therefor.
Claim 30, Column 46, Line 35, delete "ofclaiin" and insert -- of claim --, therefor.
Claim 31, Column 46, Line 45, delete "mismatch" and insert -- mismatch, --, therefor.
Claim 31, Column 46, Line 47, delete "he" and insert -- be --, therefor.
Claim 33, Column 46, Line 62, after "token" insert -- . --.
Claim 36, Column 47, Line 21, delete "perfonning" and insert -- performing --, therefor.
Claim 36, Column 47, Line 27, delete "ofthe" and insert -- of the --, therefor.
Claim 38, Column 47, Line 61, delete "pertornied" and insert -- performed --, therefor.
Claim 46, Column 48, Line 67, delete "joint," and insert -- joint --, therefor.
Claim 50, Column 49, Line 24, delete "mismatch" and insert -- mismatch, --, therefor.
Claim 50, Column 49, Line 26, delete "updated" and insert -- updated, --, therefor.
Claim 51, Column 49, Line 30, delete "inciudes:" and insert -- includes: --, therefor.
Claim 51, Column 49, Line 32, delete "tirst" and insert -- first --, therefor.
Claim 51, Column 49, Line 34, delete "fist" and insert -- first --, therefor.
Claim 55, Column 50, Line 10, delete "tirst" and insert -- first --, therefor.
Claim 55, Column 50, Line 13, delete "token" and insert -- token, --, therefor.
Claim 55, Column 50, Line 23, delete "token" and insert -- token, --, therefor.
Claim 55, Column 50, Line 26, delete "weighting" and insert -- weighting, --, therefor.
Claim 56, Column 50, Line 37, delete "ofelairn" and insert -- of claim --, therefor.
Claim 57, Column 50, Line 50, delete "perihrnied" and insert -- performed --, therefor.

Signed and Sealed this
Twenty-fifth Day of October, 2022

*Katherine Kelly Vidal*

Katherine Kelly Vidal
*Director of the United States Patent and Trademark Office*